United States Patent
Noest et al.

(10) Patent No.: US 10,069,594 B2
(45) Date of Patent: Sep. 4, 2018

(54) APPARATUS AND A METHOD FOR PROCESSING A SIGNAL DEPENDING ON A RECEIVED RADIO FREQUENCY SIGNAL

(71) Applicant: Intel IP Corporation, Santa Clara, CA (US)

(72) Inventors: Peter Noest, Munich (DE); Martin Kastner, Munich (DE); Peter Vogeler, Neubiberg (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/045,786

(22) Filed: Feb. 17, 2016

(65) Prior Publication Data

US 2016/0285587 A1    Sep. 29, 2016

(30) Foreign Application Priority Data

Mar. 27, 2015   (DE) .................. 10 2015 104 809

(51) Int. Cl.
| | |
|---|---|
| *H04L 27/06* | (2006.01) |
| *H03M 7/24* | (2006.01) |
| *H04L 1/00* | (2006.01) |
| *H04L 25/06* | (2006.01) |

(52) U.S. Cl.
CPC ............ *H04L 1/0036* (2013.01); *H04L 25/06* (2013.01)

(58) Field of Classification Search
CPC .......... H04L 27/38; H04L 27/06; H03M 7/30; H03M 7/40; H03M 7/24
See application file for complete search history.

(56) References Cited

U.S. PATENT DOCUMENTS

| | | | |
|---|---|---|---|
| 7,787,525 B1 | 8/2010 | Clark, Jr. et al. | |
| 2002/0160734 A1* | 10/2002 | Li | H03G 3/3068 455/245.1 |
| 2007/0258641 A1* | 11/2007 | Srinivasan | H03M 7/24 382/166 |

(Continued)

OTHER PUBLICATIONS

NPL System design flow and fixed-point arithmetic—Iec_Chap3 (Shoab A. Khan), Mar. 2011.*

*Primary Examiner* — Dong-Chang Shiue
(74) *Attorney, Agent, or Firm* — Eschweiler & Potashnik, LLC

(57) ABSTRACT

An apparatus for processing a signal depending on a received radio frequency signal is provided. The apparatus includes a first semiconductor circuit including a first part of a radio frequency receiver and a second semiconductor circuit including a second part of the radio frequency receiver. The apparatus further includes a digital interface configured to transmit data related to the signal depending on the received radio frequency signal from the first semiconductor circuit to the second semiconductor circuit. The first semiconductor circuit includes a first data converter configured to convert a data value of the signal depending on the received radio frequency signal from a first data format to a second data format and provide data representing the data value in the second data format to the digital interface. The second semiconductor circuit includes a second data converter configured to convert the data representing the data value in the second data format to the first data format.

20 Claims, 12 Drawing Sheets

(56) References Cited

U.S. PATENT DOCUMENTS

| | | | | |
|---|---|---|---|---|
| 2010/0305449 A1* | 12/2010 | Wegener | ............ | G01S 7/52034 600/459 |
| 2011/0122970 A1* | 5/2011 | Chappaz | ............ | H04L 27/2017 375/308 |
| 2011/0274224 A1* | 11/2011 | Aznar | ................. | H03G 3/3078 375/345 |
| 2012/0250740 A1* | 10/2012 | Ling | .................. | H04W 88/085 375/219 |
| 2016/0233941 A1* | 8/2016 | Murakami | ............... | H04B 7/04 |

* cited by examiner

APPARATUS AND A METHOD FOR PROCESSING A SIGNAL DEPENDING ON A RECEIVED RADIO FREQUENCY SIGNAL

CROSS REFERENCE TO RELATED APPLICATIONS

This application claims priority to German Application number 10 2015 104 809.4, filed on Mar. 27, 2015, the contents of which are herein incorporated by reference in its entirety.

FIELD

Examples relate to apparatuses and methods for processing a signal depending on a received radio frequency signal.

BACKGROUND

In mobile communication devices, radio frequency (RF) receivers or RF transceivers and baseband processing units may be provided on separate semiconductor chips or dies which are connected via an interface, e.g., a digital interface. RF receivers or radio frequency transceivers may be very complex and limited in available space on the die. Furthermore, the die carrying the RF receiver or transceiver may be provided in an older design node than the die carrying the baseband processing unit, e.g., the die including the baseband processing unit may be provided in 5 to 14 nm design node, whereas the die including the RF receiver or transceiver may be provided in a 28 nm, 40 nm or 65 nm design node or an even larger design node.

RF signals received by the RF receiver or transceiver may be processed digitally in the RF receiver or transceiver. For transferring the digital signal via a digital interface, the signal may be scaled to a set-point which is close to a saturation level of the digital interface in order to avoid a loss of signal quality in the event of a digital interface having a lower resolution than the RF transceiver and/or the baseband processing unit. A required gain for the signal may be determined based on a signal strength of the received signal. However, the signal strength of the received signal may vary dynamically and too fast for an accurate determination of the required gain. Therefore, the digital signal may be scaled to values which lie above the saturation level of the digital interface, so that the wave form of the digital signal is not preserved. This effect is known as clipping. Accordingly, data transfer via the digital interface may cause throughput degradation in case of a dynamically varying signal strength. Hence, there may be a desire for improved processing of a received radio frequency signal.

BRIEF DESCRIPTION OF THE DRAWINGS

Some embodiments of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some examples thereof are shown by way of example in the figures and will herein be described in detail. It should be understood, however, that there is no intent to limit examples to the particular forms disclosed, but on the contrary, examples are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular examples only and is not intended to be limiting of further examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which examples belong. It will be further understood that terms, e.g., those defined in commonly used dictionaries, should be interpreted as having a meaning that is consistent with their meaning in the context of the relevant art, unless expressly defined otherwise herein.

Figure 1A:
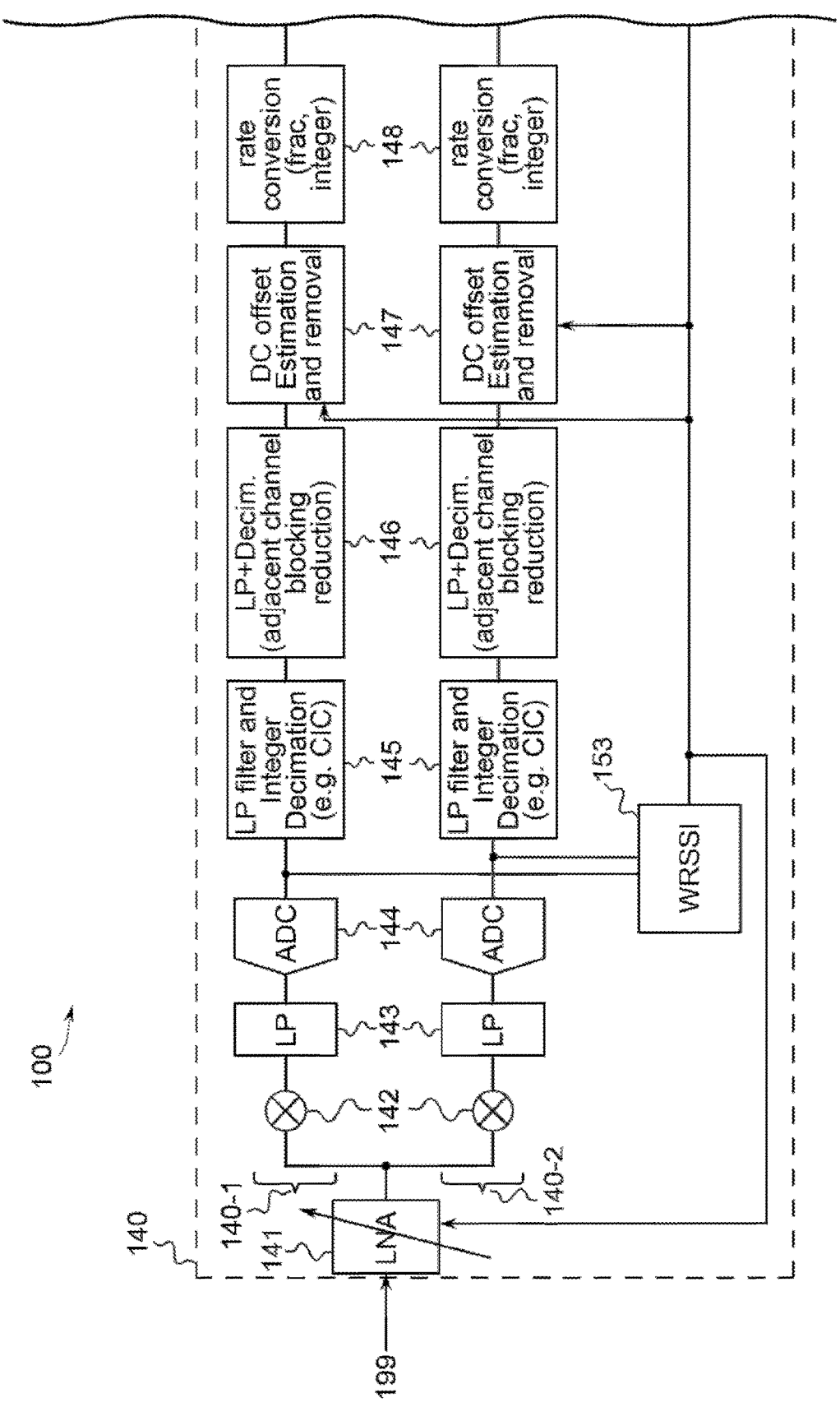
FIGS. 1A and 1B illustrate an apparatus including a radio frequency receiver and a baseband processing unit which are connected via a digital interface.
Figure 1B:
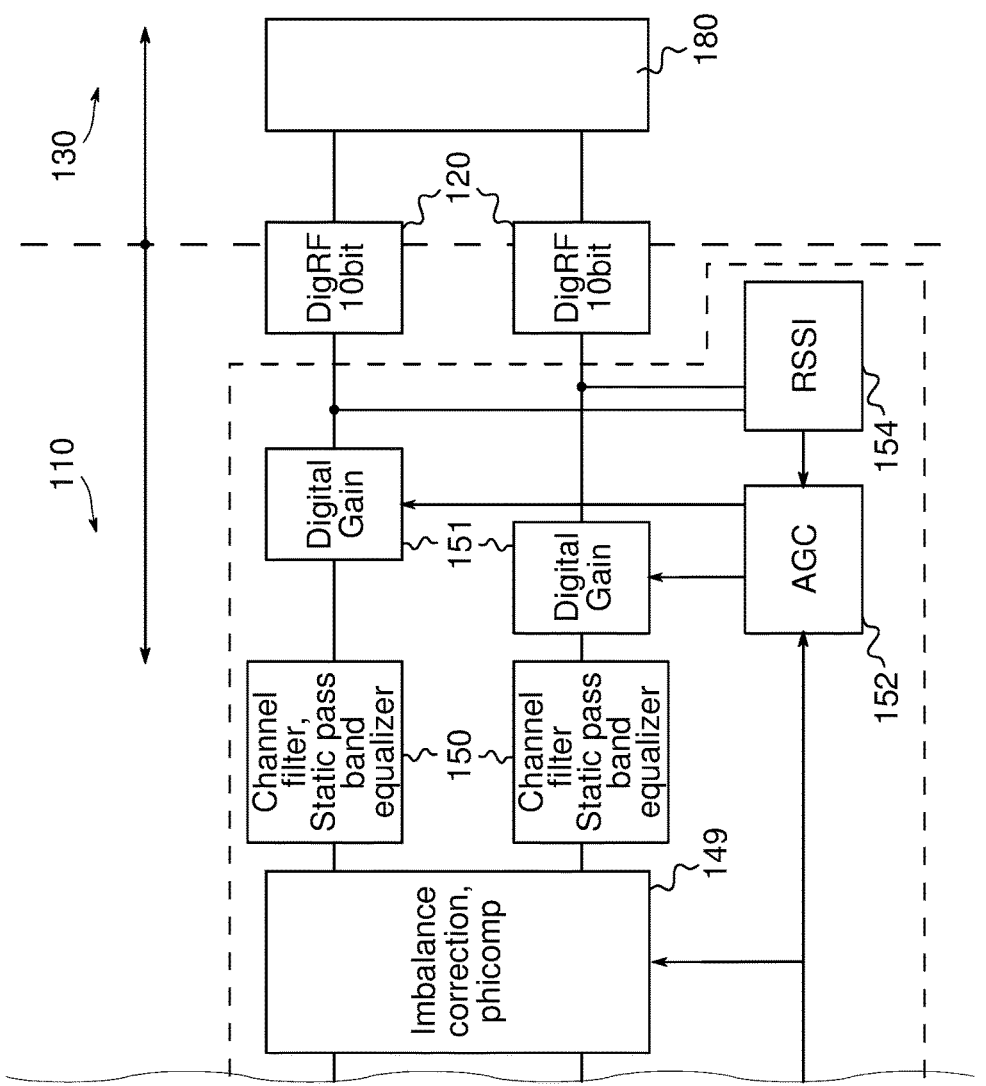

FIGS. 1A and 1B illustrate an apparatus 100 including a radio frequency (RF) receiver 140 and a baseband processing unit 180 connected via a digital interface 120. FIGS. 1A and 1B illustrate one particular example of a processing chain for receiving and decoding a signal received via, e.g., a mobile communications network, to be able to process a payload transmitted to a mobile device or a mobile terminal.

The RF receiver 140 is provided on a first semiconductor circuit 110, which may, e.g., be a first semiconductor die or a first semiconductor chip. The baseband processing unit 180 is provided on a second semiconductor circuit 130, which may, e.g., be a second semiconductor die or a second semiconductor chip.

A received RF signal 199 is provided to the RF receiver 140 by, e.g., an antenna element or a duplexer (not shown). The received RF signal 199 is provided to a Low Noise Amplifier (LNA) 141, which may amplify a possibly weak signal while adding as little noise and distortion as possible to the signal. The LNA 141 amplifies the received RF signal 199 and provides it to the mixer 142.

The receiver 140 illustrated in FIGS. 1A and 1B comprise two signal paths 140-1 and 140-2. The signal paths 140-1 and 140-2 are built-up identically or similar (e.g., for a low intermediate frequency (IF) receiver or a hetero-structure, a digital mixer or a processing unit executing a a so-called CORDIC algorithm (COordinate Rotation Digital Computer) may be comprised to shift the low IF of a received signal). That is, both signal paths 140-1 and 140-2 comprise like elements or elements having a same functionality. For example, the signal path 140-1 may be used to generate a digital in-phase component (I) out of the received RF signal 199 and process the in-phase component. The signal path 140-2 may be used to generate a digital quadrature component (Q) out of the received RF signal 199 and process the quadrature component. However, other signal representations, like a polar representation, are also feasible, resulting in another design. The same elements or elements having a same functionality included in the two signal paths 140-1, 140-2 will be described only for one of the signal paths 140-1, 140-2 in the following to avoid redundancy. It is to be understood that the explanations given for the single element may be applicable to the respective element in both signal paths 140-1, 140-2. Due to the same functionality, only a single reference number is used for like elements or elements having a same functionality within the distinct signal paths 140-1, 140-2.

The mixer 142 is used in the receiver 140 for down-mixing the received RF signal 199 to a baseband receive signal. The mixer 142 uses a local oscillator signal to down-mix the received RF signal 199. The local oscillator signals provided to the respective mixer 142 included in the signal paths 140-1 and 140-2 may have a phase difference of 90° in order to generate the in-phase and the quadrature component.

The baseband receive signal generated by the mixer 142 is provided to a low-pass filter 143 which filters the baseband receive signal in order to remove signal components outside a desired frequency band. For example, the desired frequency band may comprise frequencies of a desired receive channel and frequencies of one or more adjacent receive channels.

The analog frequency filtered baseband receive signal is provided to an Analog-to-Digital Converter (ADC) 144 which provides a digital baseband receive signal based on the analog baseband receive signal.

The digitized baseband receive signal is provided to a unit 145 which comprises one or more decimation filter(s). The decimation filter reduces a sample rate of the baseband receive signal. Therefore, processing efforts in subsequent processing units may be lowered. For example, the decimation filter may be implemented as a Cascaded-Integrator-Comb-Filter (CIC). The CIC may increase a dynamic of noise shaped signals from the ADC 144 and remove blocker signals with larger frequency offset to the desired signal.

The baseband receive signal is provided to unit 146 which comprises a low-pass filter for adjacent channel suppression. Similar to unit 145, unit 146 allows to reduce a sample rate of the baseband receive signal and to reduce signal components in frequency bands outside a frequency band of a desired receive channel. Accordingly, a baseband receive signal which contains merely filtered remainders of adjacent receive channels is provided at the output of unit 146.

In the units 145 and 146, the sample rate of the baseband receive signal is reduced to a sample rate which is closer to the theoretical lower limit given by the Nyquist-Shannon sampling theorem. Hence, the reduction of the sample rate of the baseband receive signal in the unit 145 and 146 does not cause a loss of signal information since merely the bandwidth of the baseband receive signal is reduced.

An offset-correction unit 147 is provided, which estimates an amplitude (DC) offset of the baseband receive signal. The amplitude offset may be caused by systematic effects within the preceding processing elements. In particular, the DC offset may be caused by the mixer 142 and the ADC 144. The offset-correction unit 147 further removes the estimated DC offset from the baseband receive signal. For example, the offset-correction unit 147 may subtract a mean amplitude of the baseband receive signal from an amplitude of the baseband receive signal.

A sample rate converter 148 is used to convert a sample rate of the baseband receive signal to a sample rate used by the digital interface 120. For example, the sampling rate of the digital interface may be twice the symbol rate of a baseband signal in a Universal Mobile Telecommunications System (UMTS). For example, the symbol rate may be 3.84 MSPS (Mega Samples Per Second), so that the sampling rate of the digital interface 120 may be 7.68 MSPS. A Long Term Evolution (LTE) system may use, e.g., a sample rate of 30.72 MSPS (LTE 20), so that the sample rate of the digital interface 120 may be 30.72 MSPS. That is, the sample rate of the baseband receive signal provided to the sample rate converter 148 is converted to the current sample rate of the digital interface 120.

The sample rate converter 148 is followed by a signal correction unit 149. Ideally, the I and the Q component should be orthogonal to each other in phase and have a same amplitude. However, due to the different signal-path environments and component properties in the signal paths, there may be an offset on the phase and the amplitude, which needs to be compensated. The signal correction unit 149 corrects for phase variations, which may occur due to different signal run-times in the LNA 141 for different gain settings of the LNA 141. Moreover, the signal correction unit 149 corrects imbalances between the I component processed in the signal path 140-1 and the Q component processed in the signal path 140-2. Imbalances between the I and the Q component may occur due to slightest mismatches in corresponding units of the signal paths 140-1 and 140-2.

A unit 150 comprising a channel filter is provided subsequent to the signal correction unit 149 and limits frequencies of the baseband receive signal to a frequency range of the desired receive channel. That is, remainders of adjacent receive channels are filtered by the channel filter, so that a baseband receive signal may be provided which contains merely signal components with frequencies of the desired receive channel. Moreover, the unit comprises a pass-band equalizer to compensate distorting amplitude and delay characteristics of the desired receive channel, so that the signal characteristics of the signal output by the pass-band equalizer are substantially constant in amplitude and linear in phase over the frequency band of the desired receive channel. For example, for a Code Division Multiple Access (CDMA) system, the signal correction unit 149 may further pulse shape the baseband receive signal to provide an overall required Root-Raised-Cosine (RRC) filter response from an antenna element (not shown) to an output of the signal correction unit 149.

The baseband receive signal is then provided to a gain unit 151. The gain unit 151 amplifies an amplitude of the baseband receive signal by a gain factor to a set-point which may, e.g., be close to a saturation level of the digital interface 120. The set-point may be chosen such that the amplitude of the baseband receive signal is below the saturation level of the digital interface 120 in order to preserve a signal form of the baseband receive signal. In other words, the set-point may be chosen such that clipping of the baseband receive signal may be avoided. On the other hand, the amplitude of the baseband receive signal should be chosen as high as possible in order to minimize distortion related to quantization noise of the digital interface 120.

The gain unit's 151 gain factor is determined and controlled by a gain control unit 152. The gain control unit 152 may determine the gain factor based on a signal strength of the baseband receive signal input to the gain unit 151 and a signal strength of the baseband receive signal output by the gain unit 151. For example, the signal strength of the baseband receive signal input to the gain unit 151 is determined by a first signal strength determination unit 153, which determines a signal strength of the baseband receive signal at the output of the ADC 144 in the digital domain. The signal strength of the baseband receive signal output by the gain unit 151 is, e.g., determined by a second signal strength determination unit 154, which determines a signal strength of the baseband signal at the output of the gain unit 151. The signal strengths determined by the first and second signal strength determination units 153, 154 are input to the gain control unit 152. For example, the gain control unit 152 compares a maximum amplitude of the baseband receive signal determined by the second signal strength determination unit 154 to the chosen set-point. The gain control unit 152 thus determines whether or not the currently used gain factor needs to be adjusted. Moreover, the gain control unit 152, e.g., uses the signal strength determined by the first signal strength determination unit 153 to adjust the gain factor to a varying signal strength of the baseband receive signal input to the gain unit 151.

The amplified baseband receive signal is provided to the digital interface 120, which transfers the baseband receive signal to the second semiconductor circuit 130 including the baseband processing unit 180. The baseband processing unit performs further baseband processing like, e.g., de-mapping of symbols transmitted by the baseband receive signal.

The digital interface (DigRF) 120 is able to transfer a data value or a symbol of the baseband receive signal having a certain bit length. For example, the bit length may be 10 bit. That is, the amplitude of the data value or symbol of the baseband receive signal needs to be representable by 10 bits in order to preserve a signal form of the baseband receive signal. In this example, the set-point is chosen such that the maximum amplitude of the baseband receive signal is close to the maximum amplitude value minus a Crest factor (in dB), i.e., a factor indicating a ratio of peak values to an effective value of the baseband receive signal. The maximum amplitude value which can be processed by the digital interface 120 is known as saturation level. If the data format is a signed 10 bit integer format, the maximum numerical amplitude which can be processed by the 10 bit signed integer is 511. Accordingly, the numerical set-point for the gain unit 151 should be a value which is smaller than 511 but close to this value. For example, the set-point may be set to a level of −12 dB FS to −15 dB FS (Decibels relative to full scale), i.e., to a level which is 12 dB below the saturation level of the digital interface 120. In a general view, one may summarize that the above signal processing in the RF receiver 140 is necessary to fit a, e.g., 10 bit integer representing a data value or symbol of the baseband receive signal into the, e.g., 10 bit wide digital interface 120.

In case the signal strength of the received RF signal 199 varies dynamically, the signal strength of the baseband receive signal provided to the gain unit 151 may vary, too. Moreover, different data allocations in the baseband receive signal may cause different signal strengths of the baseband receive signal provided to the gain unit 151. The gain control unit 152 may adapt the gain unit's gain factor to compensate the signal strength variations to a certain extent. However, the gain control unit 152 fails to perfectly compensate the signal strength variations of the baseband receive signal input to the gain unit 151, e.g., in the presence of high bandwidth amplitude variations. Therefore, the baseband receive signal output by the gain unit 151 may have an amplitude which lies above the saturation level of the digital interface 120. Accordingly, a signal form of the baseband receive signal is not preserved. That is, clipping of the baseband receive signal occurs. This may lead to throughput degradation in the apparatus 100.

In other words, the conventional apparatus 100 may use a slow and fine gain scaling to fit into a small 10 bit DigRF window. This may be done by using a digital control loop on the RF chip and using a setpoint of −12 . . . −15 dBFs level at DigRF bottleneck. The setpoint may be been chosen pretty high, close to peak envelope saturation under static signal conditions, to minimize the negative effect of 10 bit DigRF quantization noise. But dynamic scenarios may lead to saturation and therefore throughput loss.

Variations of the gain unit's gain factor need to be aligned with the processing in the baseband processing unit 180 in order to ensure that a baseband receive signal is provided to the baseband processing unit 180 having an amplitude in an amplitude range which is expected by the baseband processing unit 180. Misalignment may cause erroneous processing in the baseband processing unit 180 and thus degrade the throughput in the apparatus 100. Hence, exchange of information on the gain factor is required between the receiver 140 included in the first semiconductor circuit 110 and the baseband processing unit 180 included in the second semiconductor circuit 130.

In other words, if digital gain changes are not aligned with the baseband block processing, throughput degradation may be caused. If the signal is received with fading conditions or having different data allocations, then due to the periodically occurring signal level changes, the level control loop may saturate the signals at DigRF, leading to throughput degradation.

The second semiconductor circuit 130 including the baseband processing unit 180 may be provided in a first design node which is smaller than a second design node of the first semiconductor circuit 110 including the RF receiver 140.

The design node of the semiconductor circuit relates to the technology node, the semiconductor circuit is manufactured in. For example, 14 nm design node describes a technology node for manufacturing a semiconductor circuit in which a half-pitch, e.g., half a distance between identical features in an array, is 14 nm in a first wiring level. For example, a half distance between two conductor paths in the first wiring level of the semiconductor circuit may be 14 nm.

The RF receiver 140 comprises a plurality of processing units which demand a rather larger area due to the larger technology node of the semiconductor circuit 110 compared to the semiconductor circuit 130. The plurality of processing units further increases a complexity of the semiconductor circuit 110. Accordingly, an overall size of the apparatus 100 is rather large.

According to examples described herein, improved processing for a signal depending on a highly dynamic received RF signal may be achieved while lowering an overall size of an apparatus for processing the signal depending on the received RF signal compared the conventional apparatus 100.

Figure 2:
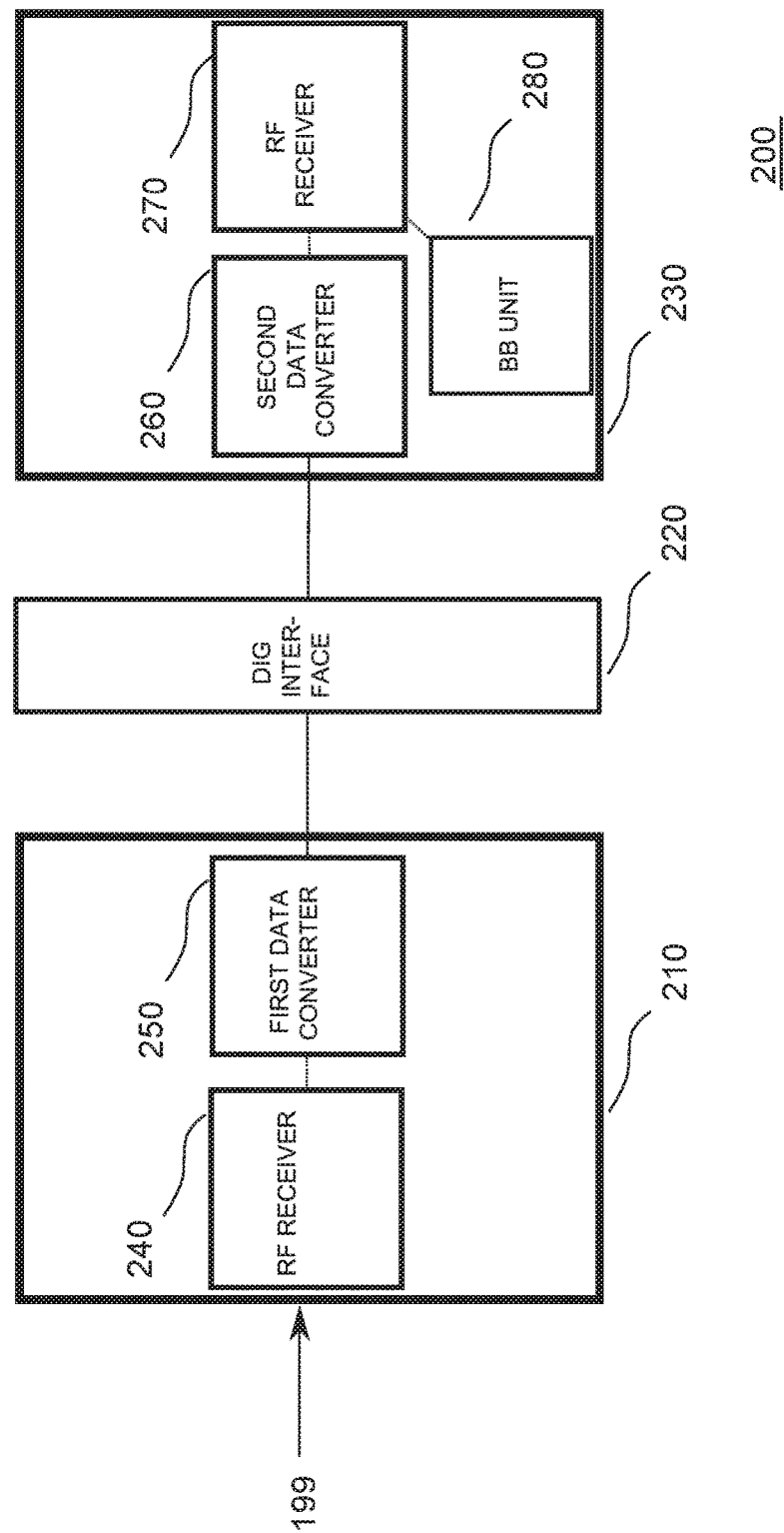
FIG. 2 illustrates an example of an apparatus for processing a signal depending on a received radio frequency signal.

FIG. 2 illustrates an example of an apparatus 200 for processing a signal depending on a received RF signal 199. The apparatus 200 comprises a first semiconductor circuit 210 including a first part of a RF receiver 240. The first semiconductor circuit 210 may, e.g., be implemented as a first semiconductor die or a first semiconductor chip. The apparatus 200 further comprises a second semiconductor circuit 230 including a second part of the RF receiver 270. In some examples, e.g., related to mobile communications, the second semiconductor circuit 230 may further include and a baseband processing unit 280. The second semiconductor circuit 230 may, e.g., be implemented as a second semiconductor die or a second semiconductor chip. Moreover, the first and second semiconductor circuits 210, 230 may be provided within a same semiconductor chip or package.

The apparatus 200 further comprises a digital interface 220 transmitting data related to the signal depending on the received RF signal 199 from the first semiconductor circuit 210 to the second semiconductor circuit 230.

The first semiconductor circuit 210 further comprises a first data converter 250 which converts a data value of the signal depending on the received RF signal 199 from a first data format to a second data format and provides data representing the data value in the second data format to the digital interface 220. The data value of the signal depending on the received RF signal 199 may be provided to the first data converter 250 by the first part of the RF receiver 240.

The second semiconductor circuit 230 further comprises a second data converter 260 which converts the data representing the data value in the second data format to the first data format. The data in the first data format may be provided to the second part of the RF receiver 270. The second part of the RF receiver 270 may process the data in the first data format and provide it to the baseband processing unit 280, which may, e.g., perform baseband processing like de-mapping or de-modulation.

Converting the data value of the signal depending on the received RF signal 199 from a first data format to a second data format may allow to reduce an amount of data to be transmitted via the digital interface 220 to the second semiconductor circuit 230. Various data formats may be used for the first and second data formats. For example, a number of bits used to represent the data value in the first data format may be higher than in the second data format. Accordingly, a data value may be transmitted via the digital interface 220 using a reduced number of bits compared to the representation of the data value in the first part of the RF receiver 240 and the second part of the RF receiver 270.

In some examples, the second data format may use a reduced number of bits compared to the first data format and a numerical range which can be represented in the second data format may comprise almost all, e.g., at least 95%, of a numerical range which can be represented in the first data format. Hence, a numerical range transmittable via the digital interface 220 may be equivalent, i.e., almost identical, to a numerical range which can be represented in the first part of the RF receiver 240 and the second part of the RF receiver 270. However, a reduced number of bits may be used for transmission via the digital interface 220.

In some examples, the first data format may comprise an integer format and the second data format may comprise a floating point format. In the floating point format, a numerical range may be represented which is equivalent or almost identical, to a numerical range representable by the integer format. However, the floating point format may use a reduced number of bits compared to the integer format since the exponential notation of the floating point format enables a high dynamic. For example, the number of bits used to represent the data value in the integer format may be from the interval starting at 14 and ending at 17 and the number of bits used to represent the data value in the floating point format may be from the interval starting at 8 and ending at 11.

As an example, the apparatus 200 may use a 14 bit integer representation in the first and the second part of the receiver 240, 270 and a 10 bit representation in the floating point format for the digital interface 220. Compared to the apparatus 100, which uses a same data format for the receiver 140 and the digital interface 120, e.g., a 10 bit integer representation, a load on the digital interface 220 may be a same as or similar to a load on the digital interface 120. However, the apparatus 200 may provide a larger numeric range for the representation of a data value. Accordingly, complex and error-prone scaling of signal amplitudes before providing the signal to a digital interface for transmission may be avoided in the apparatus 200.

In some examples, the second semiconductor circuit 230 may be provided in a second design node smaller than a first design node in which the first semiconductor circuit 210 is provided. For example, the second semiconductor circuit is provided in 5 to 14 nm design node and the first semiconductor circuit is provided in 14 to 65 nm design node or larger. The second part of the RF receiver 270 is provided on the second semiconductor circuit 230, so that the size of the second part of the RF receiver 270 may be reduced compared to an equivalent RF receiver part on the first semiconductor circuit 210. Accordingly, a size of the apparatus 200 may be reduced compared to the conventional apparatus 100. Furthermore, a complexity of the first part of the RF receiver 240 included in the first semiconductor circuit 210 may be reduced compared to the RF receiver 140 included in the first semiconductor circuit 110 of apparatus 100.

The example of an apparatus 200 illustrated in FIG. 2 may comprise one or more additional optional features corresponding to one or more aspects of the proposed concept or one or more examples described below.

Some examples related to a means for processing the signal depending on the received radio frequency signal. The means for processing the signal depending on the received radio frequency signal comprises a first means for providing a semiconductor circuit including a first part of a means for receiving a radio frequency and a means for converting a data value of the signal depending on the received radio frequency signal from a first data format to a second data format. The means for processing the signal depending on the received radio frequency signal further comprises a second means for providing a semiconductor circuit including a second part of the means for receiving a radio frequency and a means for converting data representing the data value in the second data format to the first data format. Further, the means for processing the signal depending on the received radio frequency signal comprises a means for transmitting data related to the signal depending on the received radio frequency signal from the first means for providing a semiconductor circuit to the second means for providing a semiconductor circuit. The means for converting a data value of the signal depending on the received radio frequency signal from a first data format to a second data format is configured to the provide data representing the data value in the second data format to the means for transmitting data related to the signal depending on the received radio frequency signal.

The first means for providing a semiconductor circuit may be implemented by a first semiconductor circuit described above or below (e.g. FIG. 2). The second means for providing a semiconductor circuit may be implemented by a second semiconductor circuit described above or below (e.g. FIG. 2). The first part of the means for receiving a radio frequency may be implemented by a first part of a RF receiver described above or below (e.g. FIG. 2). The second part of the means for receiving a radio frequency may be implemented by a second part of the RF receiver described above or below (e.g. FIG. 2). The means for converting a data value of the signal depending on the received radio frequency signal from a first data format to a second data format may be implemented by a first data converter described above or below (e.g. FIG. 2). The second part of the means for receiving a radio frequency and a means for converting data representing the data value in the second data format to the first data format may be implemented by a second data converter described above or below (e.g. FIG. 2). The means for transmitting data related to the signal depending on the received radio frequency signal from the first means for providing a semiconductor circuit to the second means for providing a semiconductor circuit may be implemented by a digital interface described above or below (e.g. FIG. 2).

Figure 3:
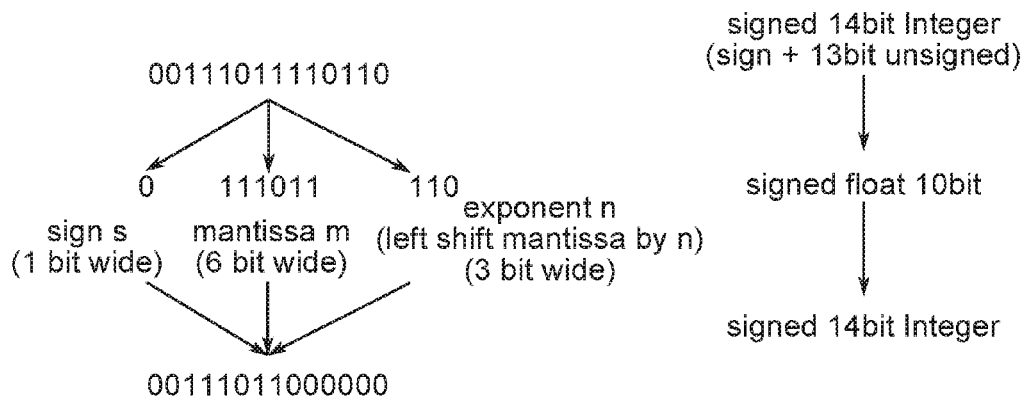
FIG. 3 illustrates an example of an integer-float-integer conversion.
Figure 4:
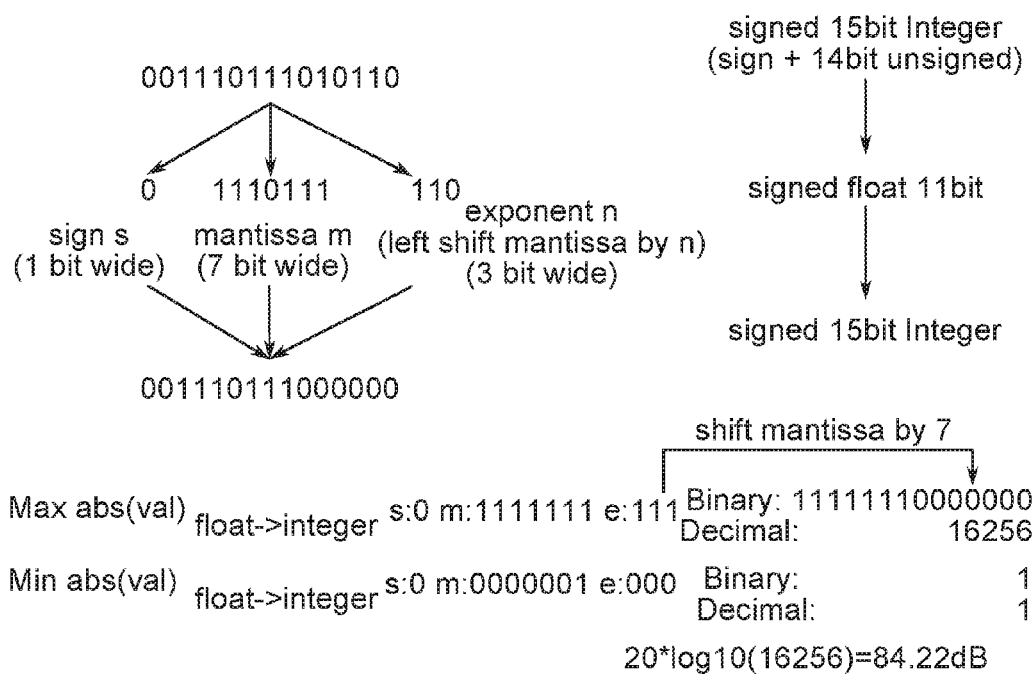
FIG. 4 illustrates another example of an integer-float-integer conversion.

FIG. 3 and FIG. 4 illustrate examples of a data value's conversion process from a first data format to a second data format and from the second data format back to the first data format. The examples shown in FIGS. 3 and 4 may illustrate the conversion of a data value of the signal depending on the received RF signal 199 in the first and second data converters 250, 260.

FIG. 3 illustrates the conversion of a data value, which is represented in the first data format as a signed 14 bit integer, to a signed 10 bit float. A $1^{st}$ bit, i.e., a most left bit or Most Significant Bit (MSB), of the signed 14 bit integer may represent a sign of the represented data value. For example, the value 0 may be assigned to a positive sign, whereas the value 1 may be assigned to a negative sign. However, the assignment may also be vice versa. The $2^{nd}$ to $14^{th}$ bits of the signed 14 bit integer may represent an amplitude of the represented data value as a binary. In the example illustrated in FIG. 3, the signed 14 bit integer 00111011110110 represents the value 3830 in decimal notation.

The signed 14 bit integer may be approximated by the signed 10 bit float. A $1^{st}$ bit, i.e., a most left bit or MSB, of the signed 10 bit float may represent a sign s of the represented data value. For example, the value 0 may be assigned to a positive sign, whereas the value 1 may be assigned to a negative sign. However, the assignment may also be vice versa. The $2^{nd}$ to $7^{th}$ bits of the signed 10 bit float may be assigned to a mantissa m of the float and the $8^{th}$ to $10^{th}$ bits of the signed 10 bit float may be assigned to an exponent e of the float. However, also other assignments of the bits to the mantissa and the exponent may be possible. In the example illustrated in FIG. 3, the signed 10 bit float s:0 m:111011 e:110 represents the value 3776 in decimal notation.

In the example illustrated in FIG. 3, the signed 10 bit float s:0 m:111011 e:110 is converted back to a signed 14 bit integer 00111011000000, which represents the value 3776 in decimal notation.

For example, the first data converter 250 may convert a data value of the signal depending on the received RF signal 199 which is represented as a signed 14 bit integer to a signed 10 bit float and provide the signed 10 bit float to the digital interface 220. The digital interface 220 may transmit the signed 10 bit float to the semiconductor circuit 230 and the second data converter 260, which is provided in the semiconductor circuit 230, may convert the signed 10 bit float back to a signed 14 bit integer.

It is apparent from the example illustrated in FIG. 3 that the integer-float-integer conversion may in some examples not be perfectly precise. However, this conversion error may be negligible.

Due to the varying signal strength of the signal depending on the received RF signal 199, the amplitudes of its data values may vary dynamically. Therefore, a dynamic range, e.g., a ratio between a largest and a smallest possible value which can be represented, of the data formats illustrated in FIG. 3 may be an important aspect.

The signed 14 bit integer illustrated in FIG. 3 may represent (absolute values are considered) values between 8191 (as 01111111111111) and 1 (as 00000000000001). The dynamic range (DR) in units of Decibel (dB) may, e.g., be determined according to $$DR = 20 \cdot \log_{10}\left(\frac{\text{maximum representable value}}{\text{minimum representable value}}\right) \quad (1)$$

Hence, the signed 14 bit integer has a dynamic range of 78.27 dB.

The signed 10 bit float illustrated in FIG. 3 may represent values between 8064 (s:0 m:111111 e:111) and 1 (s:0 m:000001 e:000). Hence, the signed 10 bit float has a dynamic range of 78.13 dB, which is more than 99% of the dynamic range of the signed 14 bit integer and thus equivalent to the dynamic range of the signed 14 bit integer. The numerical range which can be represented by the signed 10 bit float comprises more than 99% of the numerical range which can be represented by the signed 14 bit integer. However, the signed float format may use only 10 bits compared to the 14 bits of the signed integer format for representing an almost identical numerical range.

In some examples, the number of bits for a data value which can be transmitted by the digital interface 220 may be limited to a number from 8 to 11. Furthermore, the first part of the receiver 240 may use a signed integer of 14 to 17 for representing a data value of the signal depending on the received RF signal 199. Accordingly, transmitting the data value as, e.g., signed 10 bit float via the digital interface 220 allows a dynamic range for the transmission which is equivalent to a dynamic range of the first part of the receiver 240 using, e.g., a signed 14 bit integer for the representation of the data value.

FIG. 4 illustrates the conversion of a data value, which is represented in a first data format as a signed 15 bit integer, to a signed 11 bit float and back to a signed 15 bit integer similar to the situation illustrated in FIG. 3.

A $1^{st}$ bit of the signed 15 bit integer may represent a sign of the represented data value. The $2^{nd}$ to $15^{th}$ bits of the signed 15 bit integer may represent an amplitude of the represented data value. In the example illustrated in FIG. 4, the signed 15 bit integer 001110111010110 represents the value 7638 in decimal notation.

A $1^{st}$ bit of the signed 11 bit float may represent a sign s of the represented data value. The $2^{nd}$ to $8^{th}$ bits of the signed 11 bit float may be assigned to a mantissa m of the float and the $9^{th}$ to $11^{th}$ bits of the signed 11 bit float may be assigned to an exponent e of the float. However, also other assignments of the bits to the mantissa and the exponent may be possible. In the example illustrated in FIG. 4, the signed 11 bit float s:0 m:1110111 e:110 represents the value 7618 in decimal notation.

As for the example illustrated in FIG. 3, the approximation of the example illustrated in FIG. 4 may in some examples not be perfectly precise. However, the dynamic range of the signed 11 bit float is 84.22 dB which is equivalent to the dynamic range of the signed 15 bit, which is 84.28 dB. Also for the example illustrated in FIG. 4, a dynamic range for the signed float comprises more than 99% of the dynamic range of the signed integer and is thus equivalent, wherein the float format uses a reduced number of bits compared to the integer format. The numerical range which can be represented by the signed 11 bit float comprises more than 99% of the numerical range which can be represented by the signed 15 bit integer. Similar to the example illustrated in FIG. 3, transmitting the data value as, e.g., signed 11 bit float via the digital interface 220 allows a dynamic range for transmission which is equivalent to a dynamic range within the first part of the receiver 240 using, e.g., a signed 15 bit integer for the representation of the data value.

A leading 1 of the mantissa m, e.g., a MSB of the mantissa m, may in some examples not be transmitted, if the exponent e of the float is not 0. Moreover, a trailing 1 of the mantissa m, e.g., a Least Significant Bit (LSB) of the mantissa m, may in some examples not be transmitted, if the exponent e of the float is 0. For example, only 110111 may be transmitted for the mantissa m:1110111 illustrated in FIG. 4 since the exponent is non-zero (e:110). Accordingly, a signed 10 bit (without leading or trailing 1 of the mantissa) float may be used instead of the signed 11 bit float for transmission. For the example illustrated in FIG. 4, the signed 10 bit float may be s:0 m:110111 e:110. The omitted leading or trailing 1 may be taken into account by the second data converter 260. For example, the second data converter 260 may add the omitted leading or trailing 1 to the mantissa of the float before converting the float to, e.g., a signed integer as illustrated in FIG. 4. Hence, transmitting the data value as, e.g., signed 10 bit float (without leading or trailing 1 of the mantissa) via the digital interface 220 allows a dynamic range for transmission which is identical to the dynamic range the signed 11 bit float for the representation of the data value. However, one bit may be saved by the representation omitting a leading or trailing 1 of the mantissa, so that a load on the digital interface 220 may be lowered.

A leading 1 of the mantissa m may in some examples not be transmitted, if the exponent e of the float is non-zero. Moreover, a trailing 0 of the mantissa m may in some examples not be transmitted, if the exponent e of the float is zero. The omitted leading 1 or trailing 0 may be taken into account by the second data converter 260. For example, the second data converter 260 may add the omitted leading 1 or trailing 0 to the mantissa of the float before converting the float to, e.g., a signed integer as illustrated in FIG. 4. Accordingly, transmitting the data value as, e.g., signed 10 bit float (without leading 1 or trailing 0 of the mantissa) via the digital interface 220 allows a dynamic range for transmission which is identical to the dynamic range the signed 11 bit float for the representation of the data value. However, one bit may be saved by the representation omitting a leading 1 or trailing 0 of the mantissa, so that a load on the digital interface 220 may be lowered.

In general, a number of bits used to represent the data value in the first data format may be higher than in the second data format. Further, a numerical range which can be represented in the second data format, using a smaller number of bits compared to the first data format, may comprise at least 95%, 98% or 99% of a numerical range which can be represented in the first data format.

In other words, a floating point I/Q signal format may be used for the digital I/Q data transfer from RF circuitry to BB circuitry. This floating point format may use a same overall bit width and data rates as conventional integer solutions, but may enable a higher numeric dynamic due to the exponent of the floating point number. A high dynamic signal quality may be achieved without changing the needed bandwidth for DigRF.

Converting data from a first data format to a second data and back to a third data format, e.g., illustrated in connection with FIG. 3 and FIG. 4, may be implemented as a hardware routine, e.g., using combinatorial logic, logic state machines etc., or as a program having a program code configured to perform the data conversion, when the computer program is executed on a computer or processor.

Figure 5:
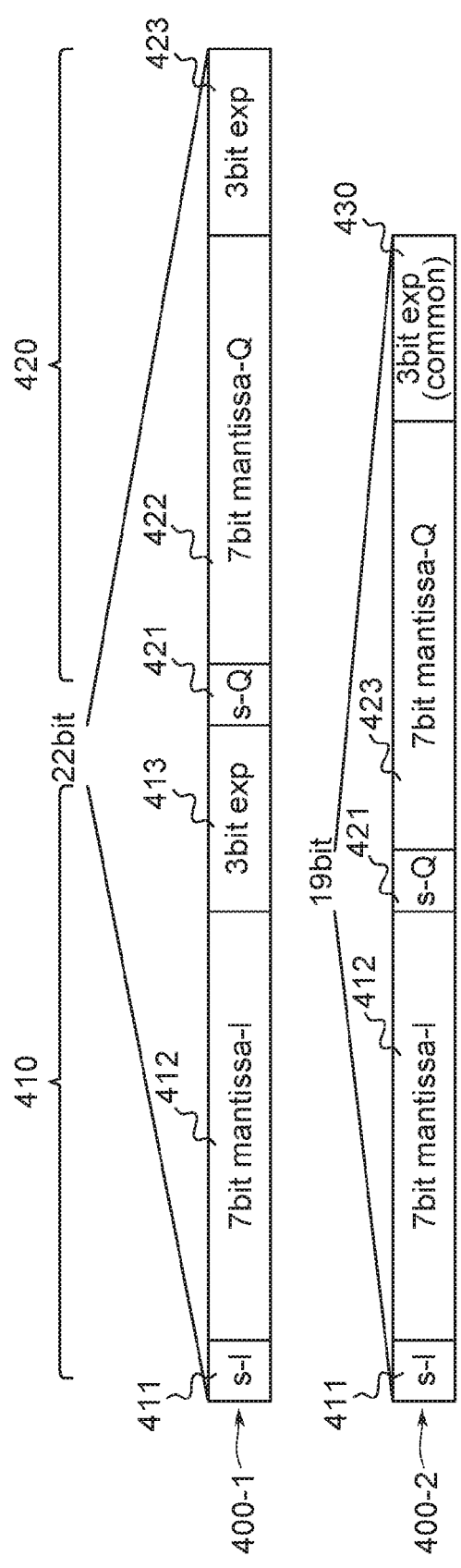
FIG. 5 illustrates examples of a data stream.
Figure 6:
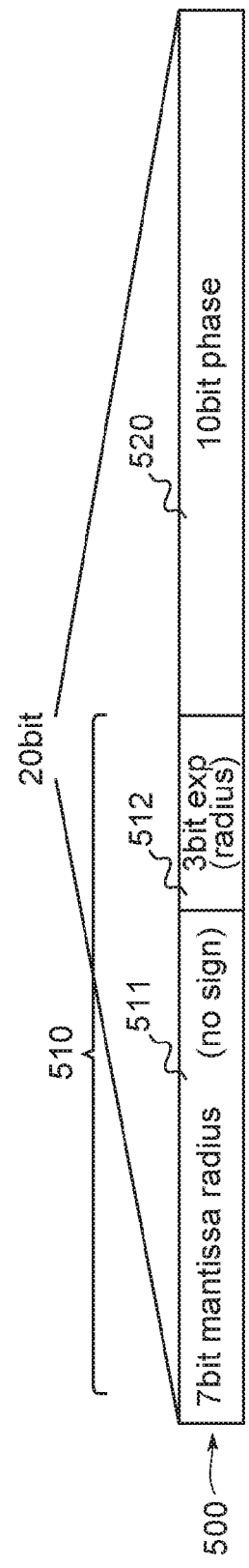
FIG. 6 illustrates another example of a data stream.

FIG. 5 and FIG. 6 illustrate examples of data streams transmitted via the digital interface 220 from the first semiconductor circuit 210 to the second semiconductor circuit 230. FIG. 5 illustrates a situation where the data representing the data value in the second data format is represented by an in-phase component and a quadrature component (Cartesian representation). FIG. 6 illustrates a situation where the data representing the data value in the second data format is represented by a radius component and a phase component (polar representation).

FIG. 5 illustrates an example of a data stream 400-1 of data representing the data value in the second data format, which may be transmitted via the digital interface 220. The data representing the data value in the second data format may be represented by an in-phase component 410 and a quadrature component 420. In the example illustrated in FIG. 5, the second data format is a signed 11 bit float similar to the situation illustrated in FIG. 4. Hence, the in-phase component 410 may be represented by a one bit wide sign 411, a seven bits wide mantissa 412 and a three bits wide exponent 413. The quadrature component 420 may be represented by a one bit wide sign 421, a seven bits wide mantissa 422 and a three bits wide exponent 423. For example, 22 bit may be needed to transmit a data value, which has an in-phase component 410 and a quadrature component 420, in the signed 11 bit float format via the digital interface 220.

FIG. 5 further illustrates an example of a data stream 400-2 which may allow to transmit a same data value in the signed 11 bit float format via the digital interface 220 using a lower total number of bits for the data value. Similar to the data stream 400-1, the data stream 400-2 may comprise a one bit wide sign 411 and a seven bits wide mantissa 412 for the in-phase component of the data value as well as a one bit wide sign 421 and a seven bits wide mantissa 422 for the quadrature value. However, the data stream 400-2 may use one common exponent 430 for the in-phase component and the quadrature component. Using one common exponent 430 for the in-phase component and the quadrature component may be possible since the in-phase component and the quadrature component may in general have a similar—in an idealistic first part of a receiver 240 an identical—amplitude and a phase difference of 90°. Using one common exponent 430 may allow to transmit the data value in the signed 11 bit float format via the digital interface 220 with 19 bits instead of the 22 bits as it is the case for data stream 400-1.

However, data representing the data value in the second data format may have a data format different from the one illustrated in FIG. 5. For example, the second data format may be a signed 10 bit float format with a one bit wide sign, a six bits wide mantissa and a three bits wide exponent. Accordingly, 20 bit may be needed to transmit a data value, which has an in-phase component and a quadrature component, in the signed 10 bit float format via the digital interface 220. 17 bit may be needed if one common exponent for the in-phase component and the quadrature component is used. It is apparent to a person skilled in the art that the number of bits for data representing the data value in the second data format is not limited to the above examples.

In general, using one common exponent for an in-phase component and a quadrature component of a data value in a floating point format may allow to reduce the number of bits needed for representing the data value. A payload on the digital interface 220 may further be reduced if more than one I component sample and more than one Q component sample are represented by one common exponent. Accordingly, the common exponent may be transmitted only once for a plurality of samples.

FIG. 6 illustrates an example of a data stream 500 of data representing the data value in the second data format, which may be transmitted via the digital interface 220. The data representing the data value in the second data format may be represented by a radius component 510 and a phase component 520. In the example illustrated in FIG. 6, the second data format comprises a combined integer and floating point format. The radius component 510 may, e.g., be represented by an unsigned 10 bit float with a seven bits wide mantissa 511 and a three bits wide exponent 512. The phase may be represented by a 10 bit wide integer 520. Using the data format of the data stream 500 may allow to transmit a data value via the digital interface 220 using 20 bits. The data stream 500 may be generated in the first data converter 250 from a data value of the signal depending on the received RF signal 199, which is represented in an integer format. However, a second data format comprising a combined integer and floating point format is not limited to the above example. Various combinations of different bit lengths for the mantissa 511, the exponent 512 of the radius component 510 and the phase component 520 are possible.

The data stream 500 may possibly be generated by the first data converter with a lower effort compared to, e.g., the above data streams in a pure floating point format, since only the radius component 510 needs to be converted to the signed 10 bit float format. Furthermore, the data stream 500 may provide a dynamic range equal to that of a data stream in pure floating point format, since the data stream 500 may provide a seven bits wide mantissa 511 and a three bits wide exponent 512 for the radius component 510, which may reproduce a dynamic of the signal depending on the received RF signal 199. A dynamic of the 10 bit wide integer for the radius component 520 may be reduced compared to the unsigned float for the radius component 510, since the dynamic of the phase component 520 may be low compared to the dynamic of the radius component 510.

Furthermore, the first data converter 250 may in some examples not provide a most significant bit of a mantissa of the data representing the data value in the floating point format to the digital interface 220 if the exponent of the data representing the data value in the floating point format is different from a lowest possible exponent in the floating point format. For example, as described above in connection with FIG. 4, a leading 1 of a mantissa may in some examples not be transmitted, if the exponent of the float is not 0, and a trailing 1 of the mantissa may in some examples not be transmitted, if the exponent of the float is 0. For example, as described above in connection with FIG. 4, a leading 1 of a mantissa may in some examples not be transmitted, if the exponent of the float is not 0, and a trailing 0 of the mantissa may in some examples not be transmitted, if the exponent of the float is 0. Hence, a number of bits used for transmitting data representing the data value in the second data format via the digital interface 220 may be reduced compared to, e.g., the data stream 400-1 illustrated in FIG. 5 or the data stream 500 illustrated in FIG. 6. For example, 6 bit wide mantissas may be used compared to the 7 bit wide mantissas of the data stream 400-1. Hence, a data value in the signed 11 bit float format may be transmitted via the digital interface 220 with 20 bits instead of the 22 bits as it is the case for the data stream 400-1. Compared to the data stream 500, a six bit wide mantissa may be used instead of the 7 bit wide mantissa 511, so that a data value may be transmitted via the digital interface 220 with 19 bits instead of the 20 bits as it is the case for the data stream 500. A dynamic range of a float using a mantissa without leading 1/trailing 0.1 may be a same as a dynamic range of a float with complete mantissa using a reduced number of bits.

Converting data from a first data format to a second data (or vice versa) in the first data converter 250 and/or the second data converter 260 may, e.g., be implemented as a hardware routine, e.g., using combinatorial logic, logic state machines etc., or as a program having a program code configured to perform the data conversion, when the computer program is executed on a computer or processor of the first data converter 250 and/or the second data converter 260.

Figure 7A:
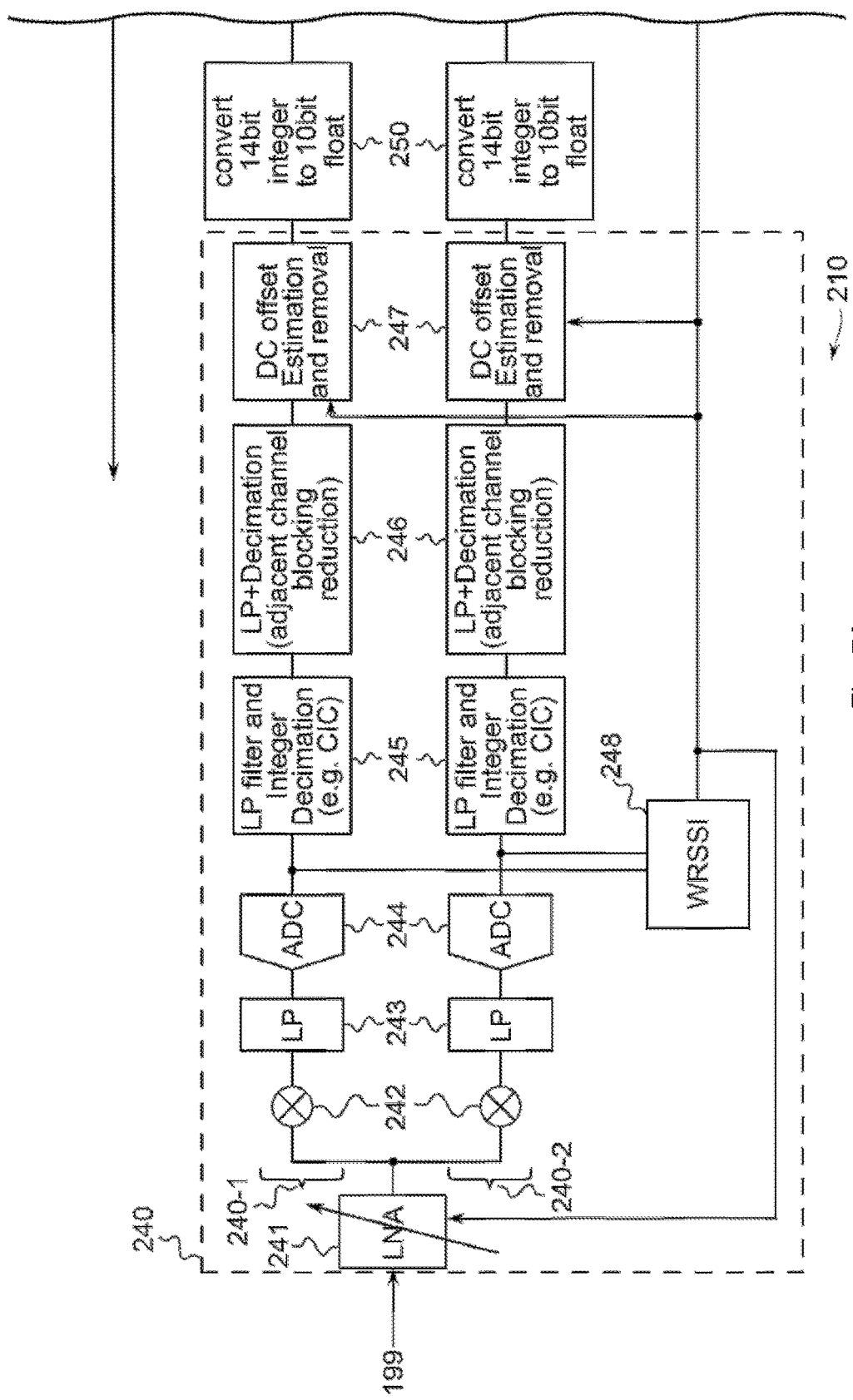
FIGS. 7A and 7B illustrate the example of an apparatus for processing a signal depending on a received radio frequency signal based on the example of FIG. 2.
Figure 7B:
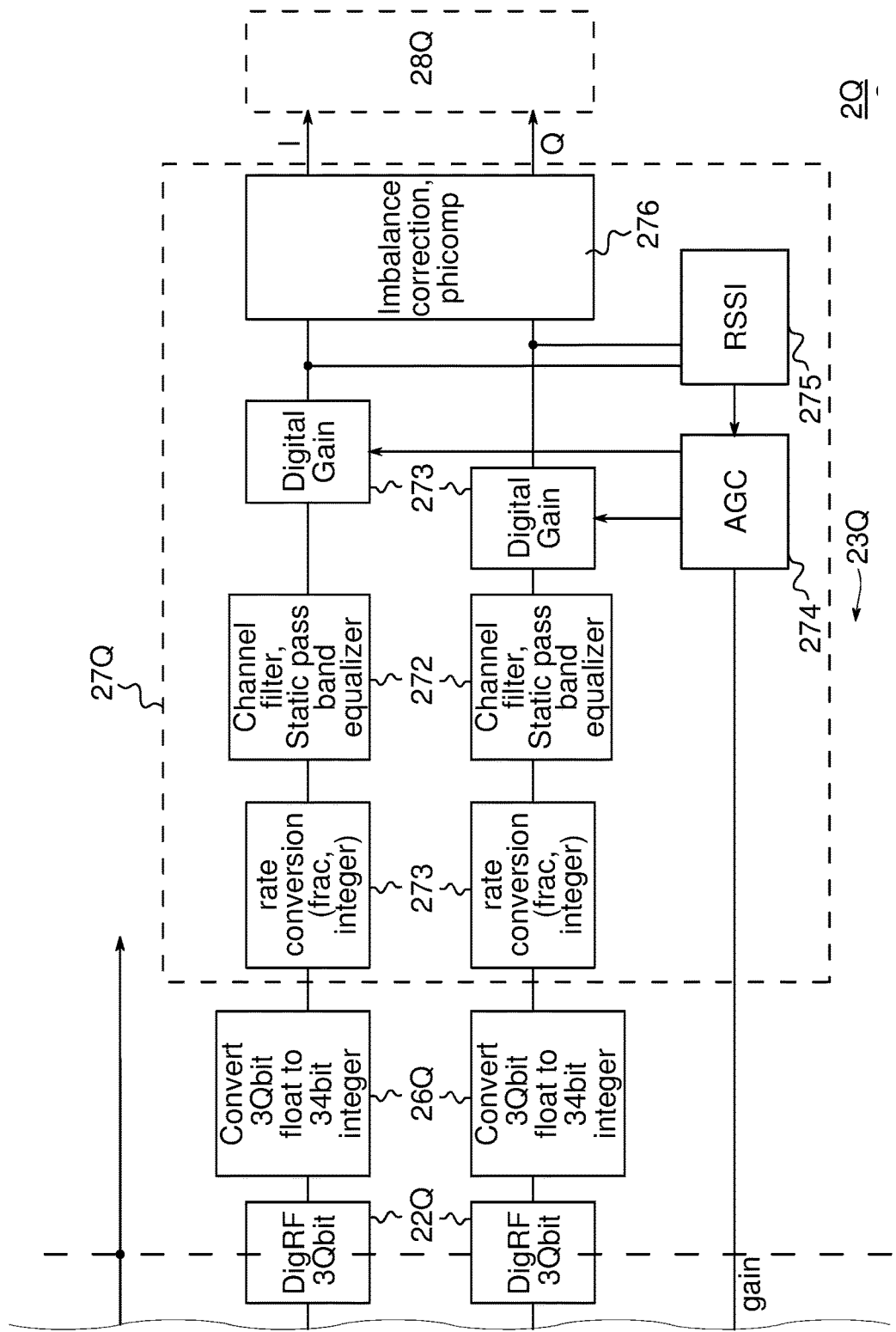

FIGS. 7A and 7B illustrate an example for an implementation of the apparatus 200 of FIG. 2. In particular, FIGS. 7A and 7B illustrate further optional elements of the first and second parts of the RF receiver 240, 270.

The first part of the RF receiver 240 may comprise a Low Noise Amplifier (LNA) 241, which may amplify a possibly weak signal while adding as little noise and distortion as possible to the signal. The LNA 241 may receive and amplify the received RF signal 199 and may provide it to a mixer 242 included in the first part of the RF receiver 240.

The first part of the RF receiver 240 and the second part of the RF receiver 270 as illustrated in FIGS. 7A and 7B may comprise two signal paths 240-1 and 240-2. The signal paths 240-1 and 240-2 may be built-up identically. For example, both signal paths 240-1 and 240-2 may comprise like elements or elements having a same functionality. For example, the signal path 240-1 may be used to generate a digital in-phase component (I) out of the received RF signal 199 and process the in-phase component. The signal path 240-2 may be used to generate a digital quadrature component (Q) out of the received RF signal 199 and process the quadrature component. However, other signal representations, like a polar representation, are also feasible, resulting in another design. The same elements or elements having a same functionality included in the two signal paths 240-1, 240-2 will be described only for one of the signal paths 240-1, 240-2 in the following to avoid redundancy. The same elements or elements having a same functionality included in the two signal paths 240-1, 240-2 will be described only for one of the signal paths 240-1, 240-2 in the following to avoid redundancy. It is to be understood that the explanations given for the single element may be applicable to the respective element in both signal paths 240-1, 240-2. Due to the same functionality, only a single reference number is used for like elements or elements having a same functionality within the distinct signal paths 240-1, 240-2.

The mixer 242 may down-mix the received RF signal 199 to a signal depending on the received RF signal. The mixer 242 may use a local oscillator signal to down-mix the received RF signal 199. The local oscillator signals provided to the respective mixer 242 included in the signal paths 140-1 and 140-2 may have a phase difference of 90° in order to generate the in-phase and the quadrature component. For example, the mixer 242 may configured to perform direct conversion, i.e., the mixer 242 may use a frequency which is identical to, or very close to a carrier frequency of an intended signal. The signal depending on the received RF signal 199 may, e.g., be a baseband receive signal.

The signal depending on the received RF signal 199 as generated by the mixer 242 may be provided to a filter element 243 which may filter the signal depending on the received RF signal 199 in order to remove signal components outside a desired frequency band. For example, the desired frequency band may comprise frequencies of a desired receive channel and frequencies of one or more adjacent receive channels. The filter element 243 may, e.g., comprise a low-pass filter. The filter element 243 may, e.g., perform coarse filtering around the desired receive channel. For example, the filter element 243 may filter any signal components outside of frequency bands of the desired receive channel.

The RF receiver may further comprise an ADC 244. The analog signal depending on the received RF signal 199 may be provided to the ADC 244 by the filter element 243 and the ADC 244 may provide a digital signal depending on the received RF signal 199 based on the analog signal depending on the received RF signal 199.

The digital signal depending on the received RF signal 199 may further be provided to a first sample rate reduction unit 245 which reduces a sample rate of the signal depending on the received RF signal 199. Therefore, processing efforts in subsequent processing units may be lowered. For example, the first sample rate reduction unit 245 may comprise a decimation filter, which may be implemented as a CIC filter. The first sample rate reduction unit 245 may further comprise a low-pass filter to correct decimation errors in the decimated signal depending on the received RF signal 199. Furthermore, the low-pass filter may reduce the bandwidth of the signal depending on the received RF signal 199. For example, the frequency range of the signal depending on the received RF signal 199 may be narrowed by the low-pass filter. Hence, signal components of receive channels adjacent to the desired receive channel may be further reduced.

The first part of the RF receiver 240 may optionally comprise a second sample rate reduction unit 246 which further reduces a sample rate of the signal depending on the received RF signal 199. The first sample rate reduction unit 245 may be implemented in a same way as the first sample rate reduction unit 245. The second sample rate reduction unit 246 may allow to further reduce a sample rate of the signal depending on the received RF signal 199 and to reduce signal components in frequency bands outside a frequency band of the desired receive channel. Accordingly, a signal depending on the received RF signal 199, which contains merely filtered remainders of adjacent receive channels, may be provided at the output of the second sample rate reduction unit 246.

In the first and second sample rate reduction units 245 and 246, the sample rate of the baseband receive signal may be reduced to a sample rate which is closer to the theoretical lower limit given by the Nyquist-Shannon sampling theorem. Hence, the reduction of the sample rate of the baseband receive signal may in some examples not cause a loss of signal information since merely the bandwidth of the baseband receive signal is reduced.

In other words, a low-pass filter at RF side for adjacent channel power reduction (including rate decimation at output) may reduce the adjacent channel power before transferring this signal via DigRF and its int-float-int conversion. This filter may in some examples not have a flat pass-band transfer characteristic (this relaxation may reduce an order of the low-pass filter).

An offset-correction unit 247 may be included in the first part of the RF receiver 240. The offset-correction unit 247 may estimate a DC offset of the signal depending on the received RF signal 199. The DC offset may be caused by systematic effects within the preceding processing elements. For example, the DC offset may be caused by the mixer 242. The offset-correction unit 247 may further remove the estimated DC offset from the signal depending on the received RF signal 199. For example, the offset-correction unit 247 may subtract a mean amplitude of the signal depending on the received RF signal 199 from an amplitude of the signal depending on the received RF signal 199. However, the offset-correction unit 247 may use various other techniques for removing a DC offset from the signal depending on the received RF signal 199.

The first part of the RF receiver 240 may further comprise a first signal information unit 248. The first signal information unit 248 may determine a first signal strength related the signal depending on the received RF signal 199. For example, the first signal information unit 248 may determine a signal strength of the signal depending on the received RF signal 199 which is output by the ADC 244. The first signal information unit 248 may provide the first signal strength related the signal depending on the received RF signal 199 to the LNA 241. The LNA 241 may accordingly adjust an analog gain factor used for amplifying the received RF signal 199. Alternatively, the first signal information unit 248 may determine the analog gain factor of the LNA 241 and provide it to the LNA 241. The first signal information unit 248 may further determine analog gain information related to the received RF signal 199. For example, the first signal information unit 248 may determine the analog gain of the LNA 241 or may be provided with information on the analog gain by the LNA 241. Information on the first signal strength related the signal depending on the received RF signal 199 may further be provided to the offset-correction unit 247, which may use the information to estimate the DC offset.

The signal depending on the received RF signal 199 may be provided by the offset-correction unit 247 to the first data converter 250 included in the first semiconductor circuit 210. The first data converter 250 converts a data value of the signal depending on the received radio frequency signal 199 from a first data format to a second data format and provides data representing the data value in the second data format to the digital interface 220. Examples for converting data from the first data format to the second data format are described with respect to, e.g., FIGS. 3 and 4.

The digital interface 220 may comprise two separate elements for transmitting data of the signal path 240-1 and the signal path 240-2 in the second data format as illustrated in FIG. 7. However, the digital interface 220 may also be implemented as a single element for transmitting data of the signal path 240-1 and the signal path 240-2 in the second data format. Examples for data streams transmitted by the digital interface 220 are described with respect to, e.g., FIGS. 5 and 6.

In other words, I/Q sampling rates may be unaffected from an integer-float-integer conversion, compared to apparatus 100, because a word length at the DigRF interface is the same as in conventional solutions (10 bit for example).

The second data converter 260 included in the second semiconductor circuit 230 receives data representing the data value in the second data format from the digital interface 220 and converts the data representing the data value in the second data format to the first data format. Examples for converting data from the second data format to the first data format are described with respect to, e.g., FIGS. 3 and 4.

The data in the first data format may be provided to the second part of the RF receiver 270.

In some examples, the first data converter 250 may generate a differential value correspondent to a difference between the data representing the data value in the first data format and data representing a preceding data value in the first data format. The first data converter may convert the differential value from the first data format to the second data format and provide data representing the differential value in the second data format to the digital interface 220. The second data converter 260 may, e.g., convert the data representing the differential value in the second data format to the first data format and generate data representing the data value in the first data format using the differential value and data representing a preceding data value in the first data format.

Using a differential value may allow improved signal transmission in case of a rather high DC offset and/or continuous wave (CW) spurs. CW spurs may characterize a crosstalk signal in the signal depending on the received RF signal 199, which may be caused by crosstalk or leakage of one of the local oscillator signals for the mixers 242 into the other local oscillator signal since the frequency of both local oscillator signals may be provided at an input of the mixer 242.

Conversion errors related to the conversion from the first data format to the second data format and back to the first data format might accumulate for the transmission of differential values via the digital interface 220. For example, conversion errors from converting an integer format to a float format and back to the integer format as described in connection with, e.g., FIG. 3, might accumulate. Accordingly, appropriate data value correction processing may be carried out in either the first data converter 250 or the second data converter 260. For example, for the integer-float-integer conversion illustrated in FIG. 3, the differential data value in the float format, which is provided to the digital interface 220, may be corrected in the first data converter 250 by the conversion error caused by the conversion from the integer format to the float format. The conversion error may be calculated by, e.g., the first data converter 250, so that the differential data value in the float format may be corrected for this error.

In order to correct for transmission errors of the digital interface 220, an offset-correction unit may be provided in the second part of the receiver 270. For example, a transmission error may cause a modification of the differential data value transmitted in the second data format. Accordingly, the data representing the data value in the first data format and data representing subsequent data values in the first data format as provided by, e.g., the second data converter 260 may be erroneous. The transmission error may cause a DC variation of the signal depending on the received RF signal 199 in the second part of the receiver 270. Hence, an offset-correction unit may correct for the transmission error. Regarding, e.g., the apparatus 200 illustrated in FIGS. 7A and 7B, the offset-correction unit 247 may be provided in the second part of the receiver 270 instead of the first part of the receiver 240.

As illustrated in FIG. 7, the second part of the RF receiver 270 may comprise a sample rate converter 271. The sample rate converter 271 may convert a sample rate related to the signal depending on the received RF signal 199 to a sample rate depending on a sample rate of the baseband processing unit 280.

The sample rate related to the signal depending on the received RF signal 199 input to the sample rate converter 271 may be reduced compared to the apparatus 100 illustrated in FIGS. 1A and 1B. As described above, the sample rate of the digital interface 120 of the apparatus 100 may be twice the symbol rate for UMTS. For example, the sampling rate of the digital interface 120 may be 7.68 MSPS for a symbol rate of 3.84 MSPS. The apparatus 200 having the sample rate converter 271 included in the second part of the RF receiver 270 may allow a sample rate at the digital interface 220 of, e.g., 5 MSPS. Accordingly, processing efforts may be reduced due to the lower sample rate. Considering LTE, the sample rate of the digital interface 120 of apparatus 100 may be 30.72 MSPS for LTE20. The apparatus 200 having the sample rate converter 271 included in the second part of the RF receiver 270 may allow a sample rate at the digital interface 220 of, e.g., 26.88 MSPS for LTE20. For example, the theoretical lower limit of the sample rate for LTE 20 is 19 MSPS according to the Nyquist-Shannon sampling theorem. Hence, apparatus 200 may enable a sample rate which is closer to the theoretical lower limit. Accordingly, processing efforts may be reduced due to the lower sample rate.

In other words, with the fractional converter located at the BB side, the sampling rates of the IQ stream may be chosen lower than in conventional approaches, leading to lower traffic on the DigRF interface. For example, for LTE20, the conventional lineup 100 may use a sample rate of 30.72 MSPS, in the example of an apparatus a sample rate between 19 MSPS and 30.72 MSPS may be used. By having the fractional converter on baseband side, a further decrease in DigRF payload may be achieved. A sample frequency between 30.72 MSPS and 19 MSPS may be used and fractional rate conversion up to 30.72 MSPS may be done on baseband side while using at DigRF interface for example only 26.88 MSPS.

A frequency filter 272 may be provided subsequent to the sample rate converter 271. The frequency filter 272 may provide the signal depending on the received RF signal 199 within a given frequency band. The frequency filter 272 may, e.g., comprise a channel filter to limit frequencies of the signal depending on the received RF signal 199 to a frequency band of the desired receive channel. For example, remainders of adjacent receive channels may be filtered by the channel filter, so that a signal depending on the received RF signal 199 may be provided which contains merely signal components with frequencies of the desired receive channel. Moreover, the channel filter may compensate the unwanted passband ripple caused by the first and second sample rate reduction unit 245, 246. The frequency filter 272 may further comprise a pass-band equalizer to compensate distorting amplitude and delay characteristics of the desired receive channel, so that the signal characteristics of the signal output by the frequency filter 272 are substantially constant in amplitude and linear in phase over the frequency band of the desired receive channel.

In other words, the channel filter on BB side may be used to compensate the unwanted passband ripple that was caused by the RF side (beside pulse shaping and residual stop band suppression).

The second part of the RF receiver 270 may comprise a gain unit 273. The gain unit 273 may modify an amplitude of the data converted from the second data format to the first data format using a gain factor. The second part of the RF receiver 270 may further comprise a gain control unit 274 to determine the gain factor. The gain control unit 274 may determine the gain factor, e.g., based on the first signal strength and/or the analog gain information provided by the first signal information unit 248 and a second signal strength related to the signal depending on the received RF signal 199, which is provided by a second signal information unit 275. For example, the signal strength of the signal depending on the received RF signal 199 at the output of the gain unit 273 may be determined as the second signal strength by the second signal information unit 275. The gain unit 273 may be provided downstream of the frequency filter 272 to ensure that merely signal components within a frequency band of the desired receive channel are amplified.

In other words, no gain unit and no gain control (AGC) is needed on RF side due to the higher dynamic range of the floating point compared to the integer format. Accordingly, the communication between BB and RF is reduced because the AGC and the digital gain block are on BB side.

A signal correction unit 276 may further be comprised in the second part of the RF receiver 260 to correct for imbalances between the signals processed in the signal paths 240-1 and 240-2. Ideally, the I and the Q component should be orthogonal to each other in phase and have a same amplitude. However, due to the different signal-path environments and component properties in the signal paths, there may be a phase offset and/or an amplitude offset. The signal correction unit 276 may correct for phase variations, which may occur due to different signal run-times in the LNA 241 for different gain factors of the LNA 241. Moreover, the signal correction unit 276 may correct imbalances between the I component processed in the signal path 240-1 and the Q component processed in the signal path 240-2. Imbalances between the I and the Q component may, e.g., occur due to slightest mismatches in corresponding units of the signal paths 240-1 and 240-2. For example, corresponding units in both signal paths 240-1, 240-2 may in some examples not behave absolutely identical, which is usually the case for electronic devices, so that slight variations—imbalances—between the I component and the Q component may occur. The signal correction unit 276 may allow to detect and correct such imbalances.

The signal depending on the received RF signal 199 output by the signal correction unit 276 may be provided to the baseband processing unit 280. The baseband processing unit 280 may perform baseband processing like, e.g., de-mapping of symbols transmitted by the signal depending on the received RF signal 199.

Compared to the apparatus 100 illustrated in FIGS. 1A and 1B, the apparatus 200 may allow to provide part of the RF frequency receiver in the semiconductor circuit 230, which includes the baseband processing unit 280. Hence, complexity of the semiconductor circuit 210 carrying the first part of the RF receiver 240 may be reduced compared to the semiconductor circuit 110 of apparatus 100. Furthermore, a combined size of the first and the second semiconductor circuits 210, 230 may be reduced compared to the apparatus 100, if the second semiconductor circuit 230 is provided in a smaller design node than the first semiconductor circuit 210.

In other words, RF transceivers with digital interface to baseband (BB) chips may get more complex in every generation. Very often transceivers are built on an older design node/chip process compared to the baseband chips. Shifting some digital blocks to the BB may make the overall modem combined die size (RF+BB) smaller and the RF simpler. Conventional solutions that are using a digital interface (e.g. DigRF), may use a lot of digital blocks on RF side, increasing overall die size and complexity of the RF receiver. The proposed solution may lower these efforts on RF Transceiver side (e.g., less filtering and signal processing on RF side) and making the overall modem (RF+BB) die size smaller especially for those cases where the BB is on a smaller design node/chip process.

The example of an apparatus 200 illustrated in FIGS. 7A and 7B may comprise one or more additional optional features corresponding to one or more aspects of the proposed concept or one or more examples described above or below.

Figure 8A:
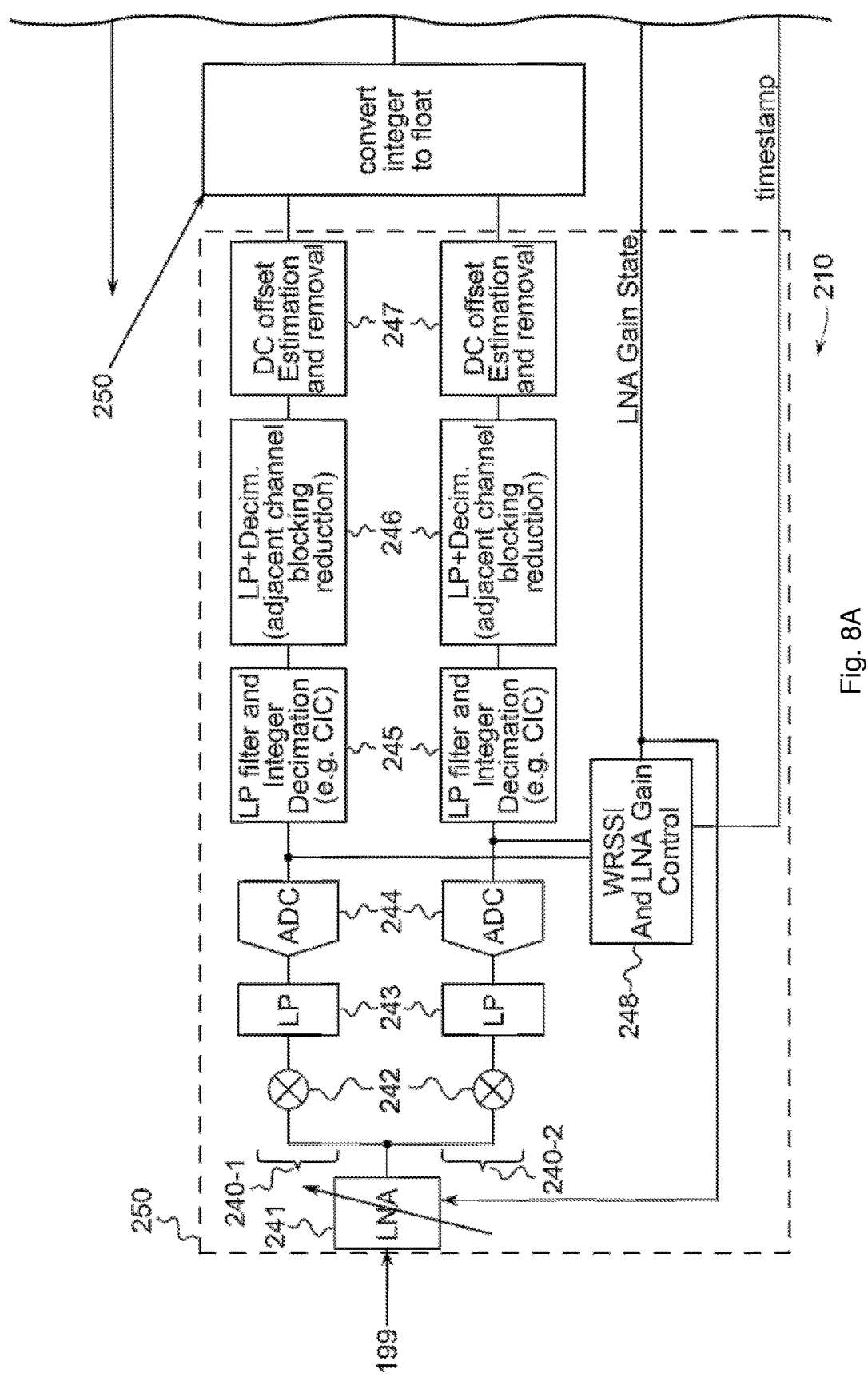
FIGS. 8A, 8B, and 8C illustrate an example of an apparatus based on the example of FIGS. 7A and 7B.
Figure 8B:
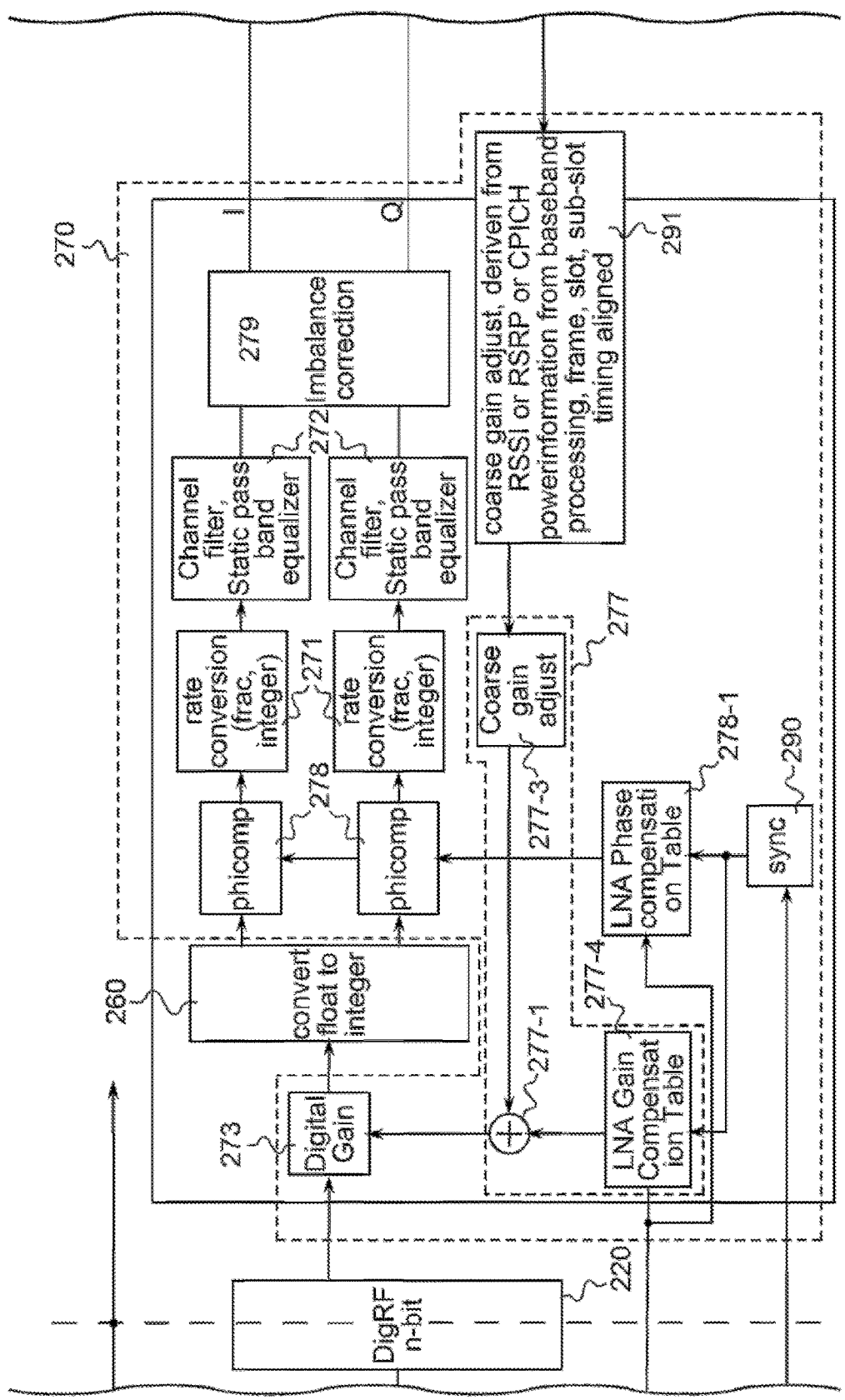
Figure 8C:
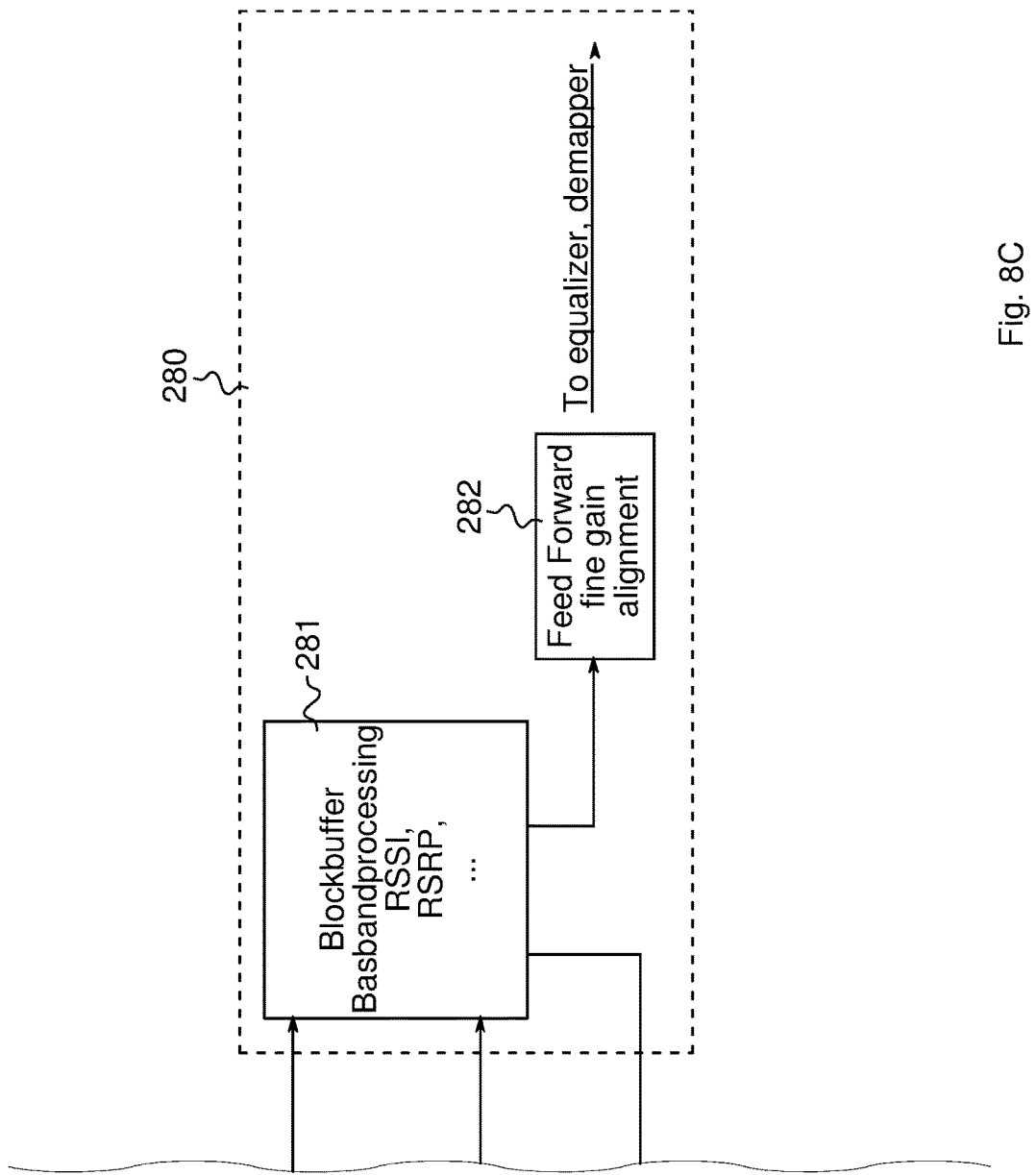

FIGS. 8A, 8B, and 8C illustrate an apparatus 300, which may be a variation of the example of an apparatus 200 illustrated in FIGS. 7A and 7B. The first part of the RF receiver 240, the first data converter 250 and the digital interface 220 may be identical to the ones illustrated in FIGS. 7A and 7B. However, the arrangement of the second data converter 260 relative to the second part of the RF receiver 270 is different compared to the situation illustrated in FIGS. 7A and 7B. Moreover, the structure of the second part of the receiver is slightly different from the one illustrated in FIGS. 7A and 7B.

In the apparatus 300, the gain unit 273 is provided upstream of the second data converter 260. For example, the data representing the data value in the second data format are provided to the gain unit 273 in the example illustrated in FIG. 8. The gain unit 273 may modify an amplitude of the data representing the data value in the second data format using a gain factor. The second part of the receiver 270 may comprise a gain control unit 277 to determine the gain factor. The gain control unit 277 may determine the gain factor based on the first signal strength and/or the analog gain information provided by the first signal information unit 248 and a second signal strength related to the signal depending on the received RF signal 199.

The second part of the receiver 270 may comprise a second signal information unit 291. The second signal information unit 291 may determine the second signal strength related to the signal depending on the received RF signal 199. For example, the second signal information unit 291 may determine the second signal strength on the basis of information provided by the baseband processing unit 280. The baseband processing unit 280 may, e.g., provide a signal strength of the signal depending on the received RF signal 199, which is determined in the baseband processing unit 280, to the second signal information unit 291. Furthermore, the baseband processing unit 280 may provide further information to the second signal information unit 291 like a Reference Signal Received Power (RSRP) for UMTS or a Common Pilot Channel (CPICH) power information for a LTE system. The information may, e.g., be provided to the second signal information unit 291 by a channel estimation unit 281 of the baseband processing unit 280

The second signal information unit 291 may provide the second signal strength to a first gain adjustment unit 277-3, which may determine an auxiliary gain factor based on the second signal strength.

The gain control unit 277 may further comprise a second gain adjustment unit 277-4, which may receive the first signal strength and/or the analog gain information from the first signal information unit 248. The second gain adjustment unit 277-4 may determine a correction for the auxiliary gain factor based on the first signal strength and/or the analog gain information. For example, the second gain adjustment unit 277-4 may comprise a look-up table which stores corrections for different combinations of the first signal strength and the analog gain information.

The auxiliary gain factor and the correction for the auxiliary gain factor may be provided to a gain factor determination unit 277-1 which determines the gain factor based on these inputs. For example, the gain factor determination unit 277-1 may comprise an adder which adds the correction for the auxiliary gain factor to the auxiliary gain factor and provides the resultant to the gain unit 273 as the gain factor.

Placing the gain unit 273 upstream of the second data converter 260 may allow a more robust amplification of the signal depending on the RF signal 199. For example, an amplitude of a 10 bit data value in a floating point format may be modified by the gain unit 273. As discussed above, the floating point format may have a dynamic range which is equivalent to that of an integer format using more bits, e.g., 14, for the representation of the data value. Accordingly, the floating point format may offer an adequate headroom, e.g., an adequate difference between an actual amplitude of the data value and a maximum possible amplitude. Hence, the gain factor may be adjusted less precise compared to, e.g., the apparatus 200 illustrated in FIGS. 7A and 7B. A fine adjustment of the level of the signal depending on the received RF signal 199 may, e.g., be done by a feed forward unit 281 of the baseband processing unit 280, which may feed the signal depending on the received RF signal 199 from the channel estimation unit 281 to a mapping unit or other elements of the baseband processing unit 280. Accordingly, an energy consumption of the second semiconductor circuit 230 may be reduced to, e.g., the apparatus 200 illustrated in FIGS. 7A and 7B.

Since the gain factor may be adjusted less precise for varying signal strengths, which may be related to a changing data allocation in the signal or fading received RF signals 199, clipping of the signal depending on the received RF signal 199 may be prevented compared to the set-point scaling used in the apparatus 100 illustrated in FIGS. 1A and 1B.

In other words, a digital gain may be adjusted coarse and therefore less often (to fit the IQ signal into the, e.g., 12-14 bit window of digital baseband signal processing). Hence, further increase of the signal quality may be achieved. The fine adjustment of the level for the mapper may be done by the channel estimator feed forward to the mapper. A coarse floating point scaling may be used to fit into the larger, e.g., 12-14 bit word-length window, having larger headroom. This coarse scaling may be controlled by a baseband channel estimator (synchronized to slot timing). Fitting into a wide quantizing-window may provide larger headroom to saturation while maintaining also good quantization noise. This may be advantageous for scenarios with periodically level changes (like periodically changing data allocations or fading scenarios).

In apparatus 200 as well as in apparatus 300, the gain unit 273 is provided in the second semiconductor circuit 230 which further includes the baseband processing unit 280. Alignment of the gain factor for the gain unit 273 with the processing in the baseband processing unit 280 may be facilitated compared to the apparatus 100 in FIGS. 1A and 1B, since an exchange of information on the gain factor is merely required between the second part of the receiver 270 and the baseband processing unit 280 which are both provided in the second semiconductor circuit 230. Exchanging information between the first and the second semiconductor circuits 210, 230 for aligning the gain factor to the processing in the baseband processing unit 280 may be avoided. In other words, the digital gain may synchronized with BB slot processing.

In the apparatus 300, the functionality of the signal correction unit 276 illustrated in FIGS. 7A and 7B is split. Imbalance correction may be performed by an imbalance correction unit 279, which may be provided downstream of the frequency filter 272. A phase correction unit 278 may be provided between the second data converter 260 and the sample rate converter 271. The phase correction unit 278 may correct phase variations related to, e.g., different runtimes in the LNA 241 for different analog gain factors.

The phase correction unit 278 may be provided with phase correction information by the phase information unit 278-1. The phase information unit 278-1 may be provided with the analog gain information by the first signal information unit 248 and determine phase correction information based on the analog gain information. For example, the phase information unit 278-1 may comprise a look-up table which stores phase correction information related to the analog gain information.

Moreover, the phase information unit 278-1 and the second gain adjustment unit 277-4 may be synchronized by the synchronization unit 290. The synchronization unit 290 may receive timing information from the first signal information unit 248 related the first signal strength and/or the analog gain information. The synchronization unit 290 may ensure that the phase information unit 278-1 and the second gain adjustment unit 277-4 process a corresponding first signal strength and/or corresponding analog gain information.

The example of an apparatus 300 may comprise one or more additional optional features corresponding to one or more aspects of the proposed concept or one or more examples described above or below.

In some examples, an offset-correction unit may be provided in the second part of the receiver 270. Regarding, e.g., the apparatus 200 illustrated in FIGS. 7A and 7B or FIGS. 8A, 8B, and 8C, the offset-correction unit 247 may be provided in the second part of the receiver 270 instead of the first part of the receiver 240. The offset-correction unit may correct a DC offset block-wise, e.g., in terms of blocks of data. A gain control unit, e.g., the gain control unit 274 illustrated in FIGS. 7A and 7B or the gain control unit 277 illustrated in FIGS. 8A, 8B, and 8C, may determine the gain factor block-wise. For example, gain adjustment and DC offset removal may be performed on a same block on which data samples have been determined. Block wise processing may indicate that a sequence of samples is attributed to an entity called block. Some attributes may then be derived using all samples within the block, such as for example a mean amplitude used for, e.g., correction of a DC offset, Hence, no additional lag may be introduced. For example, in the receiver 100, where DC offset correction and gain adjustment are performed in the RF receiver 140, each block has to be completely stored an re-processed before first IQ samples of each block may be transmitted via the digital interface 120. Hence, neither DC offset removal nor gain adjustment may be performed lag free in the RF receiver 140 since block buffering (e.g., slot wise) introduces an additional lag of, e.g., one slot, at the digital interface 120.

An important aspect for a reception system is its error vector magnitude (EVM), which is a measure how constellation points calculated from a received signal deviate from the ideal locations.

The apparatus 100 may have 1% EVM for a signed 8 bit integer digital interface 120 with a set-point of the gain unit 151 at −12 dB Fs and 0.25% EVM for a signed 10 bit integer digital interface 120 with a set-point of the gain unit 151 at −12 dB Fs for a static scenario. For example, a scenario with a rather static signal strength. In a dynamic scenario clipping may occur due to gain unit and the set-point used in the RF receiver 140.

The apparatus 200 or the apparatus 300 may have a comparable EVM for a signed 14 bit integer—signed 10 bit float at the digital interface 220—signed 14 bit integer data conversion for a static scenario. In a dynamic scenario clipping may be avoided due to the floating point format at the digital interface 220 and the provision of the gain unit 273 in the second part of the receiver 270. Although the EVM for the apparatuses 200, 300 may in some cases be a little bit higher compared to apparatus 100, clipping of the signal depending on the received RF signal may be avoided. Moreover, an EVM below 1% may assure adequate calculation of the constellation points in the apparatuses 200, 300.

Figure 9:
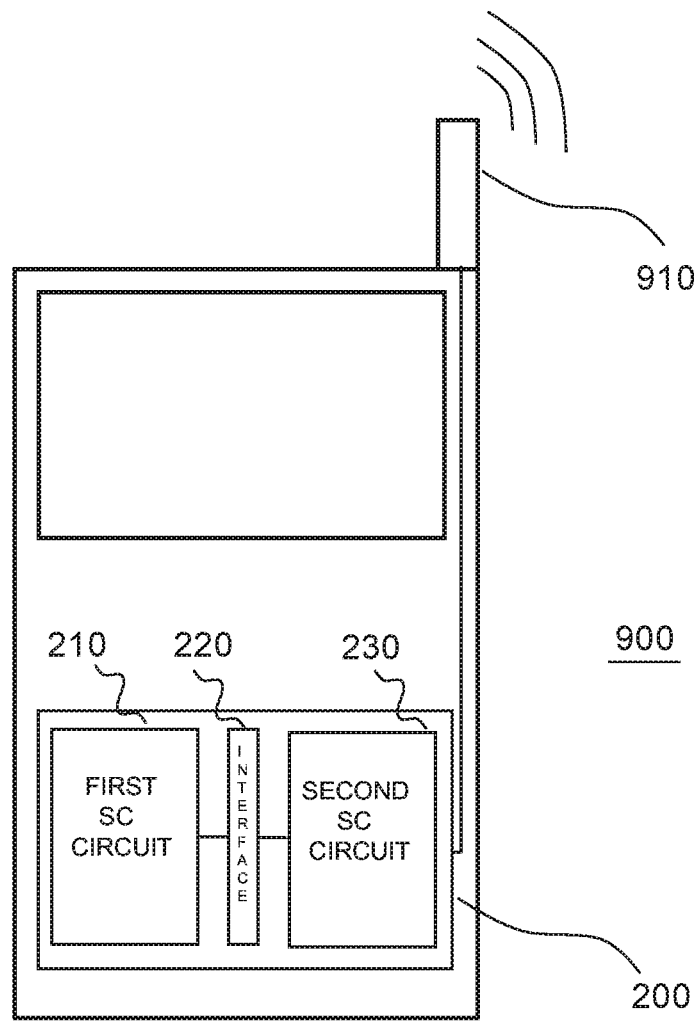
FIG. 9 illustrates an example of a mobile communications device comprising an example of an apparatus for processing a signal depending on a received radio frequency signal.

FIG. 9 schematically illustrates an example of a mobile communications device or mobile phone or user equipment 900 comprising an apparatus 200 according to an example described herein. Apparatus 200 may comprise a first semiconductor circuit 210, a digital interface 220 and a second semiconductor circuit 230. An antenna element 910 of mobile communications device 900 may be coupled to apparatus 200 to provide a received radio frequency signal to first semiconductor circuit 210 including a first part of a radio frequency receiver 240. To this end, mobile communications devices may be provided having less complex and size reduced chips for radio frequency receivers.

The example of a mobile communications device 900 may comprise one or more additional optional features corresponding to one or more aspects of the proposed concept or one or more examples described above or below.

The various elements of both the first semiconductor circuit 210 and the second semiconductor circuit 230 have been illustrated as separate elements in the above description. It should be noted that all or some of the elements of a semiconductor circuit may be implemented as a common element. For example, one or more of the elements described herein may be implemented as functionalities of a processing unit.

Figure 10:
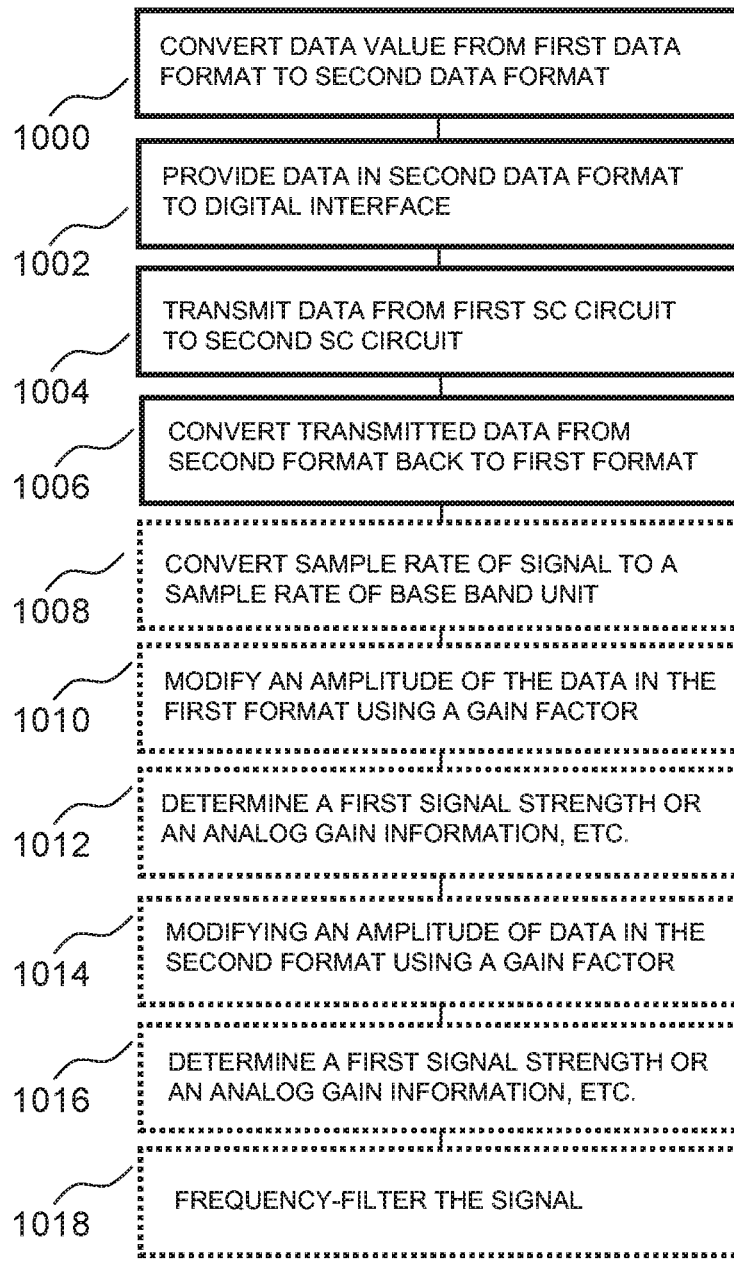
FIG. 10 illustrates a flowchart of an example of a method for processing a signal depending on a received radio frequency signal.

An example of a method for processing a received radio frequency signal is illustrated by means of a flowchart in FIG. 10. The method comprises converting 1000 a data value of the signal depending on the received radio frequency signal from a first data format to a second data format in a first part of a radio frequency receiver included in a first semiconductor circuit. The method further comprises providing 1002 data representing the data value in the second data format to a digital interface. Further, the method comprises transmitting 1004 via the digital interface the data representing the data value in the second data format from the first semiconductor circuit to a second semiconductor circuit including a second part of the radio frequency receiver. The method further comprises converting 1006 the data representing the data value in the second data format to the first data format in the second part of the radio frequency receiver.

Optionally, providing 1002 data representing the data value in the second data format to a digital interface may comprise: generating a differential value corresponding to a difference between the data value in the first data format and a preceding data value in the first data format; converting the differential value from the first data format to the second data format; and providing data representing the differential value in the second data format to the digital interface.

The method may optionally comprise converting 1008 in the second part of the radio frequency receiver a sample rate related to the signal depending on the received radio frequency signal to a sample rate depending on a sample rate of the baseband processing unit.

Optionally, the method may comprise modifying 1010 in the second part of the radio frequency receiver an amplitude of the data converted from the second data format to the first data format using a gain factor.

The method may optionally comprise the following processing 1012: determining in the first part of the radio frequency receiver a first signal strength related to the signal depending on the received radio frequency signal and/or analog gain information related to the received radio frequency signal; determining in the second part of the radio frequency receiver a second signal strength related to the signal depending on the received radio frequency signal; and determining in the second part of the radio frequency receiver the gain factor based on the first signal strength and/or the analog gain information and the second signal strength.

As an alternative, the method may optionally comprise modifying 1014 in the second part of the radio frequency receiver an amplitude of the data representing the data value in the second data format using a gain factor.

The method may further optionally comprise the following processing 1016: determining in the first part of the radio frequency receiver a first signal strength related to the signal depending on the received radio frequency signal and/or analog gain information related to the received radio frequency signal; and determining in the second part of the radio frequency receiver the gain factor based on the first signal strength and/or the analog gain information and signal information provided by the baseband processing unit.

Optionally, converting 1006 the data representing the data value in the second data format to the first data format in the second part of the radio frequency receiver may comprise converting the amplitude modified data representing the data value in the second data format to the first data format.

The method may optionally comprise frequency-filtering 1018 in the second part of the radio frequency receiver the signal depending on the received radio frequency signal.

Optionally, the method may further comprise modifying in the second part of the radio frequency receiver an amplitude of the signal depending on the received radio frequency signal by a mean amplitude of the signal depending on the received radio frequency signal. The amplitude of the signal depending on the received radio frequency signal 199 may be modified block-wise by the mean amplitude of the signal depending on the received radio frequency signal 199 and further the gain factor may be determined block-wise.

More details and aspects of the method are mentioned in connection with the proposed concept or one or more examples described above or below (e.g. FIGS. 1-9). The method may comprise one or more additional optional features corresponding to one or more aspects of the proposed concept or one or more examples described above or below.

The examples as described herein may be summarized as follows:

Example 1 is an apparatus for processing a signal depending on a received radio frequency signal, comprising: a first semiconductor circuit including a first part of a radio frequency receiver and a first data converter configured to convert a data value of the signal depending on the received radio frequency signal from a first data format to a second data format; a second semiconductor circuit including a second part of the radio frequency receiver and a second data converter configured to convert data representing the data value in the second data format to the first data format; and a digital interface configured to transmit data related to the signal depending on the received radio frequency signal from the first semiconductor circuit to the second semiconductor circuit, wherein the first data converter is configured to provide the data representing the data value in the second data format to the digital interface.

In example 2, the second semiconductor circuit further includes a baseband processing unit.

In example 3, a number of bits used to represent the data value in the first data format is higher than in the second data format.

In example 4, a numerical range which can be represented in the second data format comprises at least 95% of a numerical range which can be represented in the first data format in the apparatus of example 3.

In example 5, the first data format comprises an integer format and the second data format comprises a floating point format in the apparatus of example 1, 2 or 3.

In example 6, the number of bits used to represent the data value in the integer format is from the interval starting at 14 and ending at 17 and the number of bits used to represent the data value in the floating point format is from the interval starting at 8 and ending at 11 in the apparatus of example 5.

In example 7, the data representing the data value in the second data format in the apparatus of example 5 or example 6 comprises an in-phase component and a quadrature component, wherein the first data converter is configured to provide the data representing the data value in the floating point format using one common exponent for the in-phase component and the quadrature component In example 8, the data representing the data value in the second data format in the apparatus of any of examples 1 to 4 comprises a radius component and a phase component, wherein the first data format comprises an integer format, and wherein in the second data format the radius component comprises a floating point format and the phase component comprises an integer format.

In example 9, the first data converter of the apparatus of example 5, 6 or 8 is configured such that a most significant bit of a mantissa of the data representing the data value in the floating point format is not provided to the digital interface if the exponent of the data representing the data value in the floating point format is different from a lowest possible exponent in the floating point format.

In example 10, the first data converter is configured to generate a differential value corresponding to a difference between the data value in the first data format and a preceding data value in the first data format; convert the differential value from the first data format to the second data format; and provide data representing the differential value in the second data format to the digital interface.

In example 11, the second part of the radio frequency receiver comprises at least one sample rate converter configured to convert a sample rate related to the signal depending on the received radio frequency signal to a sample rate depending on a sample rate of the baseband processing unit.

In example 12, the second part of the radio frequency receiver comprises at least one gain unit configured to modify an amplitude of the data converted from the second data format to the first data format using a gain factor.

In example 13, the first part of the receiver of the apparatus of example 12 comprises a first signal information unit configured to determine a first signal strength related to the signal depending on the received radio frequency signal and/or analog gain information related to the received radio frequency signal; the second part of the receiver comprises a second signal information unit configured to determine a second signal strength related to the signal depending on the received radio frequency signal; and the second part of the receiver comprises a gain control unit which is configured to determine the gain factor based on the first signal strength and/or the analog gain information and the second signal strength.

In example 14, the second part of the radio frequency receiver comprises at least one gain unit configured to modify an amplitude of the data representing the data value in the second data format using a gain factor.

In example 15, the first part of the receiver of the apparatus of example 14 comprises a first signal information unit configured to determine a first signal strength related to the signal depending on the received radio frequency signal and/or analog gain information related to the received radio frequency signal; and the second part of the receiver comprises a gain control unit which is configured to determine the gain factor based on the first signal strength and/or the analog gain information and signal information provided by the baseband processing unit.

In example 16, the second data converter of the apparatus of example 14 or 15 is configured to convert the data representing the data value in the second data format modified by the gain unit.

In example 17, the second part of the radio frequency receiver comprises at least one frequency filter configured to provide the signal depending on the received radio frequency signal within a given frequency band.

In example 18, the second part of the radio frequency receiver of the apparatus of example 13 or example 15 comprises an offset-correction unit configured to modify an amplitude of the signal depending on the received radio frequency signal by a mean amplitude of the signal depending on the received radio frequency signal, wherein the offset-correction unit and the gain control unit are configured to process the signal depending on the received radio frequency signal block-wise.

In example 19, the second semiconductor circuit is provided in a second design node smaller than a first design node in which the first semiconductor circuit is provided.

In example 20, the second semiconductor circuit of the apparatus of example 19 is provided in 5 to 14 nm design node and the first semiconductor circuit of the apparatus of example 19 is provided in 14 to 65 nm design node or larger.

Example 21 is a mobile communications device comprising an apparatus for processing a signal depending on a received radio frequency signal according to any of examples 1 to 20.

In example 22, the mobile communications device further comprises at least one antenna coupled to the apparatus.

Example 23 is a means for processing a signal depending on a received radio frequency signal, comprising: a first means for providing a semiconductor circuit including a first part of a means for receiving a radio frequency and a means for converting a data value of the signal depending on the received radio frequency signal from a first data format to a second data format; a second means for providing a semiconductor circuit including a second part of the means for receiving a radio frequency and a means for converting data representing the data value in the second data format to the first data format; and a means for transmitting data related to the signal depending on the received radio frequency signal from the first means for providing a semiconductor circuit to the second means for providing a semiconductor circuit, wherein the means for converting a data value of the signal depending on the received radio frequency signal from a first data format to a second data format is configured to the provide data representing the data value in the second data format to the means for transmitting data related to the signal depending on the received radio frequency signal.

In example 24, the second means for providing a semiconductor circuit further includes a means for baseband processing.

In example 25, a number of bits used to represent the data value in the first data format is higher than in the second data format for the means for processing of example 23 or 24.

In example 26, a numerical range which can be represented in the second data format comprises at least 95% of a numerical range which can be represented in the first data format in the means for processing of example 25.

In example 27, the first data format comprises an integer format and the second data format comprises a floating point format in the means of example 23, 24 or 25.

In example 28, the number of bits used to represent the data value in the integer format is from the interval starting at 14 and ending at 17 and the number of bits used to represent the data value in the floating point format is from the interval starting at 8 and ending at 11 in the means of example 27.

In example 29, the data representing the data value in the second data format in the means of example 26 or 27 comprises an in-phase component and a quadrature component, wherein the means for converting a data value of the signal depending on the received radio frequency signal from a first data format to a second data format is configured to provide the data representing the data value in the floating point format using one common exponent for the in-phase component and the quadrature component.

In example 30, the data representing the data value in the second data format in the means of any of examples 23 to 26 comprises a radius component and a phase component, wherein the first data format comprises an integer format, and wherein in the second data format the radius component comprises a floating point format and the phase component comprises an integer format.

In example 31, the means for converting a data value of the signal depending on the received radio frequency signal from a first data format to a second data format in the means of example 27, 28 or 30 is configured such that a most significant bit of a mantissa of the data representing the data value in the floating point format is not provided to the a means for transmitting data related to the signal depending on the received radio frequency signal if the exponent of the data representing the data value in the floating point format is different from a lowest possible exponent in the floating point format.

In example 32, the means for converting a data value of the signal depending on the received radio frequency signal from a first data format to a second data format is configured to generate a differential value corresponding to a difference between the data value in the first data format and a preceding data value in the first data format; convert the differential value from the first data format to the second data format; and provide data representing the differential value in the second data format to the means for transmitting data related to the signal depending on the received radio frequency signal.

In example 33, the second part of the means for receiving a radio frequency comprises at least one means for converting a sample rate related to the signal depending on the received radio frequency signal to a sample rate depending on a sample rate of the means for baseband processing.

In example 34, the second part of the means for receiving a radio frequency comprises at least one means for modifying an amplitude of the data converted from the second data format to the first data format using a gain factor.

In example 35, the first part of the means for receiving a radio frequency of the means of example 34 comprises a means for determining a first signal strength related to the signal depending on the received radio frequency signal and/or analog gain information related to the received radio frequency signal; the second part of the means for receiving a radio frequency comprises a means for determining a second signal strength related to the signal depending on the received radio frequency signal; and the second part of the means for receiving a radio frequency comprises a means for determining the gain factor based on the first signal strength and/or the analog gain information and the second signal strength.

In example 36, the second part of the means for receiving a radio frequency of the means of any of examples 23 to 33 comprises at least one means for modifying an amplitude of the data representing the data value in the second data format using a gain factor.

In example 37, the first part of the means for receiving a radio frequency of the means of example 36 comprises a means for determining a first signal strength related to the signal depending on the received radio frequency signal and/or analog gain information related to the received radio frequency signal; and the second part of the means for receiving a radio frequency comprises a means for determining the gain factor based on the first signal strength and/or the analog gain information and signal information provided by the means for baseband processing.

In example 38, the means for converting the data representing the data value in the second data format to the first data format of the means of example 36 or 37 is configured to convert the data representing the data value in the second data format modified by the gain unit.

In example 39, the second part of the means for receiving a radio frequency comprises at least one means for providing the signal depending on the received radio frequency signal within a given frequency band.

In example 40, the second means for providing a semiconductor circuit is provided in a second design node smaller than a first design node in which the first second means for providing a semiconductor circuit is provided.

In example 41, the second means for providing a semiconductor circuit of the means of example 40 is provided in 5 to 14 nm design node and the first second means for providing a semiconductor circuit of the means of example 40 is provided in 14 to 65 nm design node or larger.

Example 42 is a method for processing a signal depending on a received radio frequency signal, comprising: converting a data value of the signal depending on the received radio frequency signal from a first data format to a second data format in a first part of a radio frequency receiver included in a first semiconductor circuit; providing data representing the data value in the second data format to a digital interface; transmitting via the digital interface the data representing the data value in the second data format from the first semiconductor circuit to a second semiconductor circuit including a second part of the radio frequency receiver; and converting the data representing the data value in the second data format to the first data format in the second semiconductor circuit.

In example 43, a number of bits used to represent the data value in the first data format is higher than in the second data format in the method of example 42.

In example 44, a numerical range which can be represented in the second data format comprises at least 95% of a numerical range which can be represented in the first data format in the method of example 43.

In example 45, the first data format comprises an integer format and the second data format comprises a floating point format in the method of example 42 or 43.

In example 46, the number of bits used to represent the data value in the integer format is from the interval starting at 14 and ending at 17 and the number of bits used to represent the data value in the floating point format is from the interval starting at 8 and ending at 11 in the method of example 45.

In example 47, the data representing the data value in the second data format in the method of example 45 or 46 comprises an in-phase component and a quadrature component; and the data representing the data value in the floating point format are provided using one common exponent for the in-phase component and the quadrature component.

In example 48, the data representing the data value in the second data format in the method of any of examples 42 to 44 comprises a radius component and a phase component, wherein the first data format comprises an integer format, and wherein in the second data format the radius component comprises a floating point format and the phase component comprises an integer format.

In example 49, a most significant bit of a mantissa of the data representing the data value in the floating point format in the method of any of examples 45, 46 or 48 is not provided to the interface if the exponent of the data representing the data value in the floating point format is different from a lowest possible exponent in the floating point format.

In example 50, providing data representing the data value in the second data format to the digital interface comprises: generating a differential value corresponding to a difference between the data value in the first data format and a preceding data value in the first data format; converting the differential value from the first data format to the second data format; and providing data representing the differential value in the second data format to the digital interface.

In example 51, the method further comprises converting in the second part of the radio frequency receiver a sample rate related to the signal depending on the received radio frequency signal to a sample rate depending on a sample rate of the baseband processing unit.

In example 52, the method further comprises modifying in the second part of the radio frequency receiver an amplitude of the data converted from the second data format to the first data format using a gain factor.

In example 53, the method of example 52 further comprises: determining in the first part of the radio frequency receiver a first signal strength related to the signal depending on the received radio frequency signal and/or analog gain information related to the received radio frequency signal; determining in the second part of the radio frequency receiver a second signal strength related to the signal depending on the received radio frequency signal; and determining in the second part of the radio frequency receiver the gain factor based on the first signal strength and/or the analog gain information and the second signal strength.

In example 54, the method of any of examples 42 to 51 further comprises modifying in the second part of the radio frequency receiver an amplitude of the data representing the data value in the second data format using a gain factor.

In example 55, the method of example 54 further comprises: determining in the first part of the radio frequency receiver a first signal strength related to the signal depending on the received radio frequency signal and/or analog gain information related to the received radio frequency signal; and determining in the second part of the radio frequency receiver the gain factor based on the first signal strength and/or the analog gain information and signal information provided by the baseband processing unit.

In example 56, converting the data representing the data value in the second data format to the first data format in the second part of the radio frequency receiver in the method of example 54 or 55 comprises converting the amplitude modified data representing the data value in the second data format to the first data format.

In example 57, the method further comprises frequency-filtering in the second part of the radio frequency receiver the signal depending on the received radio frequency signal.

In example 58, the method of example 53 or example 55 further comprises modifying in the second part of the radio frequency receiver an amplitude of the signal depending on the received radio frequency signal by a mean amplitude of the signal depending on the received radio frequency signal, wherein the amplitude of the signal depending on the received radio frequency signal is modified block-wise by the mean amplitude of the signal depending on the received radio frequency signal and the gain factor is determined block-wise.

Example 59 is a computer readable storage medium having stored thereon a program having a pro-gram code for performing the method of any of examples 42 to 58, when the program is executed on a computer or processor.

Example 60 is a computer program having a program code configured to perform the method of any of examples 42 to 58, when the computer program is executed on a computer or processor.

Herein, some examples are also intended to cover program storage devices, e.g., digital data storage media, which are machine or computer readable and encode machine-executable or computer-executable programs of instructions, wherein the instructions perform some or all of the acts of the above-described methods. The program storage devices may be, e.g., digital memories, magnetic storage media such as magnetic disks and magnetic tapes, hard drives, or optically readable digital data storage media. Further examples are also intended to cover computers programmed to perform the acts of the above-described methods or (field)

programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and examples of the disclosure, as well as specific examples thereof, are intended to encompass equivalents thereof.

Functional blocks denoted as "means for . . . " (performing a certain function) shall be understood as functional blocks comprising circuitry that is configured to perform a certain function, respectively. Hence, a "means for s.th." may as well be understood as a "means configured to or suited for s.th.". A means configured to perform a certain function does, hence, not imply that such means necessarily is performing the function (at a given time instant).

Functions of various elements shown in the figures, including any functional blocks labeled as "means", "means for providing a sensor signal", "means for generating a transmit signal.", etc., may be provided through the use of dedicated hardware, such as "a signal provider", "a signal processing unit", "a processor", "a controller", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some examples a single act may include or may be broken into multiple sub acts. Such sub acts may be included and part of the disclosure of this single act unless explicitly excluded.

What is claimed is:

1. An apparatus for processing a signal depending on a received radio frequency signal, comprising:
    a first semiconductor circuit including a first part of a radio frequency receiver and a first data converter circuit configured to convert a data value of the signal depending on the received radio frequency signal from an integer format to a floating point format;
    a second semiconductor circuit including a second part of the radio frequency receiver and a second data converter circuit configured to convert data representing the data value in the floating point format to the integer format; and
    a digital interface circuit configured to transmit data related to the signal depending on the received radio frequency signal from the first semiconductor circuit to the second semiconductor circuit,
    wherein the first data converter circuit is configured to provide the data representing the data value in the floating point format to the digital interface circuit, and
    wherein the first data converter circuit is configured such that a most significant bit of a mantissa of the data representing the data value in the floating point format is not provided to the digital interface if the exponent of the data representing the data value in the floating point format is different from a lowest possible exponent in the floating point format.

2. The apparatus of claim 1, wherein the second semiconductor circuit further includes a baseband processing circuit.

3. The apparatus of claim 1, wherein a number of bits used to represent the data value in the integer format is higher than in the floating point format.

4. The apparatus of claim 3, wherein a numerical range which can be represented in the floating point format comprises at least 95% of a numerical range which can be represented in the integer format.

5. The apparatus of claim 1, wherein
    the data representing the data value in the floating point format comprises an in-phase component and a quadrature component; and
    the first data converter circuit is configured to provide the data representing the data value in the floating point format using one common exponent for the in-phase component and the quadrature component.

6. The apparatus of claim 1, wherein the first data converter circuit is configured to generate a differential value corresponding to a difference between the data value in the integer format and a preceding data value in the integer format;

convert the differential value from the integer format to the floating point format; and provide data representing the differential value in the floating point format to the digital interface.

7. The apparatus of claim 1, wherein the second part of the radio frequency receiver comprises at least one sample rate converter circuit configured to convert a sample rate related to the signal depending on the received radio frequency signal to a sample rate depending on a sample rate of the baseband processing circuit.

8. The apparatus of claim 1, wherein the second part of the radio frequency receiver comprises at least one gain unit configured to modify an amplitude of the data converted from the floating point format to the integer format using a gain factor.

9. The apparatus of claim 8, wherein the first part of the receiver comprises a first signal information circuit configured to determine a first signal strength related to the signal depending on the received radio frequency signal and/or analog gain information related to the received radio frequency signal;

the second part of the receiver comprises a second signal information circuit configured to determine a second signal strength related to the signal depending on the received radio frequency signal; and the second part of the receiver comprises a gain control circuit which is configured to determine the gain factor based on the first signal strength and/or the analog gain information and the second signal strength.

10. The apparatus of claim 1, wherein the second part of the radio frequency receiver comprises at least one gain circuit configured to modify an amplitude of the data representing the data value in the floating point format using a gain factor.

11. The apparatus of claim 10, wherein the first part of the receiver comprises a first signal information circuit configured to determine a first signal strength related to the signal depending on the received radio frequency signal and/or analog gain information related to the received radio frequency signal; and the second part of the receiver comprises a gain control circuit which is configured to determine the gain factor based on the first signal strength and/or the analog gain information and signal information provided by the baseband processing circuit.

12. The apparatus of claim 10, wherein the second data converter circuit is configured to convert the data representing the data value in the floating point format modified by the gain circuit.

13. The apparatus of claim 1, wherein the second semiconductor circuit is provided in a second design node smaller than a first design node in which the first semiconductor circuit is provided.

14. The apparatus of claim 1, wherein the data representing the data value in the floating point format comprises a radius component in the floating point format and a phase component in the integer format.

15. A method for processing a signal depending on a received radio frequency signal, comprising:

converting a data value of the signal depending on the received radio frequency signal from a integer format to a floating point format in a first part of a radio frequency receiver included in a first semiconductor circuit using a first data converter circuit;

providing data representing the data value in the floating point format to a digital interface circuit;

transmitting via the digital interface the data representing the data value in the floating point format from the first semiconductor circuit to a second semiconductor circuit including a second part of the radio frequency receiver; and converting the data representing the data value in the floating point format to the integer format in the second semiconductor circuit using a second data converter circuit, wherein a most significant bit of a mantissa of the data representing the data value in the floating point format is not provided to the digital interface if the exponent of the data representing the data value in the floating point format is different from a lowest possible exponent in the floating point format.

16. The method of claim 15, wherein a number of bits used to represent the data value in the integer format is higher than in the floating point format.

17. The method of claim 16, wherein a numerical range which can be represented in the floating point format comprises at least 95% of a numerical range which can be represented in the integer format.

18. The method of claim 15, wherein the data representing the data value in the floating point format comprises an in-phase component and a quadrature component; and the data representing the data value in the floating point format are provided using one common exponent for the in-phase component and the quadrature component.

19. The method of claim 15, wherein the data representing the data value in the floating point format comprises a radius component in the floating point format and a phase component in the integer format.

20. A non-transitory computer readable storage medium having stored thereon a program having a program code comprising executable instructions for performing the method of claim 15, when the program is executed on a computer or processor.

* * * * *